US012649413B2

(12) United States Patent
Onoda et al.

(10) Patent No.: US 12,649,413 B2
(45) Date of Patent: Jun. 9, 2026

(54) VEHICULAR LIGHT SOURCE SYSTEM, VEHICULAR SENSING SYSTEM, AND VEHICLE

(71) Applicant: KOITO MANUFACTURING CO., LTD., Tokyo (JP)

(72) Inventors: Yukihiro Onoda, Shizuoka (JP); Hidemichi Sone, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 874 days.

(21) Appl. No.: 17/926,387

(22) PCT Filed: Apr. 30, 2021

(86) PCT No.: PCT/JP2021/017293
§ 371 (c)(1),
(2) Date: Nov. 18, 2022

(87) PCT Pub. No.: WO2021/235220
PCT Pub. Date: Nov. 25, 2021

(65) Prior Publication Data
US 2023/0184902 A1 Jun. 15, 2023

(30) Foreign Application Priority Data

May 20, 2020 (JP) ................................. 2020-088259
May 20, 2020 (JP) ................................. 2020-088260

(51) Int. Cl.
*B60Q 1/24* (2006.01)
*G01S 7/481* (2006.01)
*G01S 7/497* (2006.01)

(52) U.S. Cl.
CPC ............ *B60Q 1/249* (2022.05); *G01S 7/4815* (2013.01); *G01S 7/497* (2013.01)

(58) Field of Classification Search
CPC ............................... G01S 7/4815; G01S 7/497
See application file for complete search history.

(56) References Cited

U.S. PATENT DOCUMENTS

2017/0201068 A1 7/2017 Furuya et al.

FOREIGN PATENT DOCUMENTS

CN 106482291 A 3/2017
CN 110350391 A 10/2019
(Continued)

OTHER PUBLICATIONS

"Semiconductor Lasers," downloaded from Thorlabs.com. (Year: 2016).*

(Continued)

*Primary Examiner* — Yuqing Xiao
(74) *Attorney, Agent, or Firm* — Sughrue Mion, PLLC

(57) ABSTRACT

A vehicular light source system includes: first and second laser emitters configured to emit first and second lasers; a thermometer configured to measure peripheral temperature; and a light source controller. The strength of the first laser at a temperature lower than a threshold temperature is higher than that of the second laser at that temperature. The strength of the first laser at a temperature higher than the threshold temperature is lower than that of the second laser at that temperature. The light source controller is configured to control the first and the second laser emitters such that: the strength of the first laser becomes higher than that of the second laser if the peripheral temperature is lower than the threshold temperature; and the strength of the second laser becomes higher than that of the first laser if the peripheral temperature is higher than or equal to the threshold temperature.

17 Claims, 14 Drawing Sheets

(56)     References Cited

FOREIGN PATENT DOCUMENTS

| JP | 9-277887 A | 10/1997 |
| JP | 2014-62796 A | 4/2014 |
| JP | 2014062796 A * | 4/2014 |

OTHER PUBLICATIONS

Online article from Thorlabs.com. (Year: 2016).*
Office Action dated Mar. 11, 2025 issued by the State Intellectual Property Office of People's Republic of China in Chinese Patent Application No. 202180036409.7.

* cited by examiner

FIG. 2

REAR

LEFT

RIGHT

FRONT

*FIG. 13*

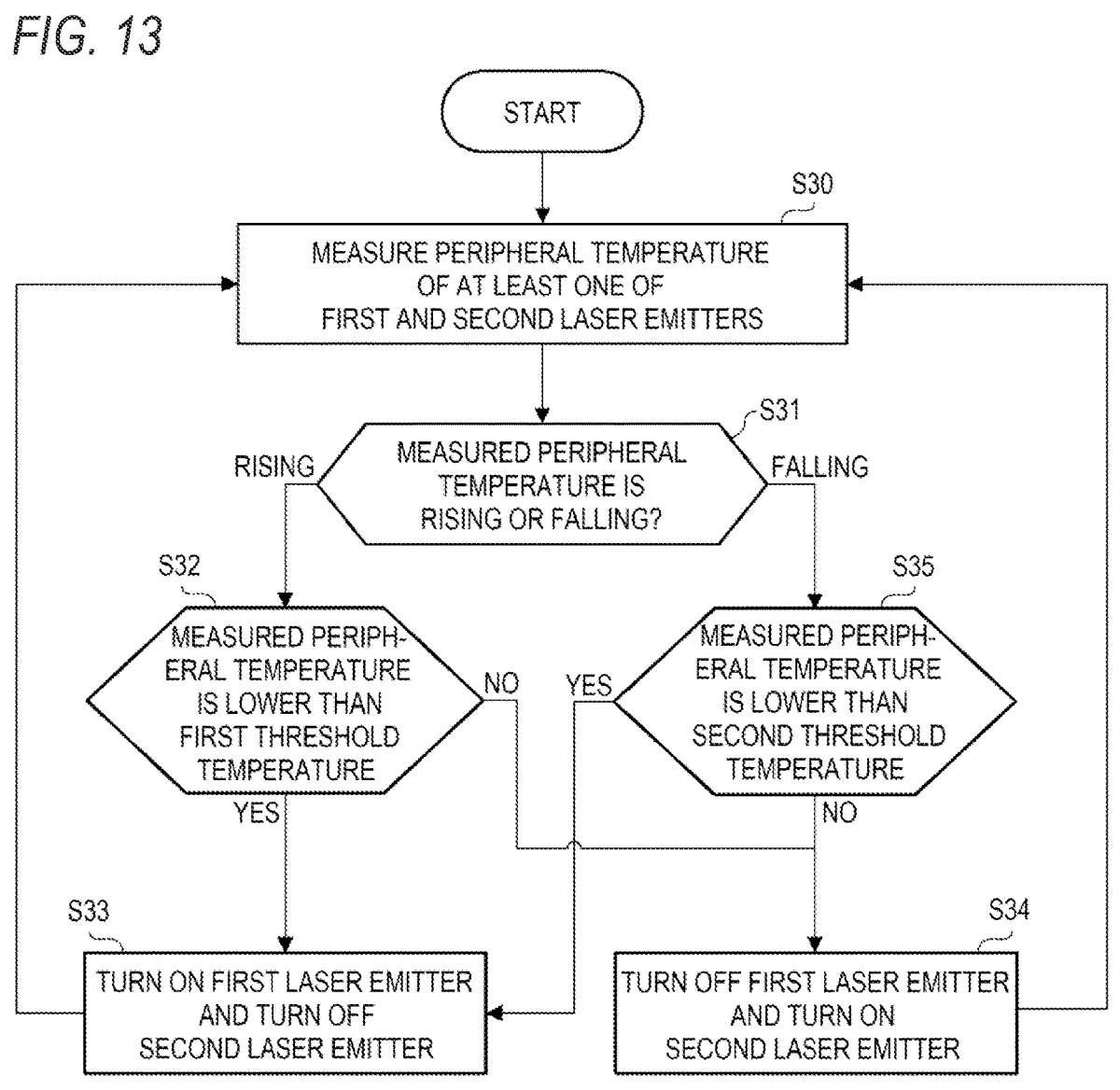

START

S30

MEASURE PERIPHERAL TEMPERATURE
OF AT LEAST ONE OF
FIRST AND SECOND LASER EMITTERS

S31

RISING    MEASURED PERIPHERAL
TEMPERATURE IS
RISING OR FALLING?    FALLING

S32

MEASURED PERIPH-
ERAL TEMPERATURE
IS LOWER THAN
FIRST THRESHOLD
TEMPERATURE    NO

YES

S35

MEASURED PERIPH-
ERAL TEMPERATURE
IS LOWER THAN
SECOND THRESHOLD
TEMPERATURE    NO

YES

S33

TURN ON FIRST LASER EMITTER
AND TURN OFF
SECOND LASER EMITTER

S34

TURN OFF FIRST LASER EMITTER
AND TURN ON
SECOND LASER EMITTER

VEHICULAR LIGHT SOURCE SYSTEM, VEHICULAR SENSING SYSTEM, AND VEHICLE

CROSS-REFERENCE TO RELATED APPLICATIONS

This application is a National Phase Entry of PCT International Application No. PCT/JP2021/017293, filed on Apr. 30, 2021, which claims priority to Japanese Patent Application No. 2020-088259 filed on May 20, 2020, and Japanese Patent Application No. 2020-088260 filed on May 20, 2020, the contents of all of which are incorporated herein by reference in their entirety.

TECHNICAL FIELD

The present disclosure relates to a vehicular light source system, a vehicular sensing system, and a vehicle.

BACKGROUND

Recently, in various countries, research on automated driving of vehicles has been actively conducted, and legislation for permitting vehicles to travel on public roads in self-driving mode has been considered. In self-driving mode, a vehicle system autonomously controls traveling of a vehicle. Specifically, in self-driving mode, the vehicle system autonomously executes at least control of steering (the direction of travel) or control of an accelerator and brakes (acceleration, deceleration, and braking), based on information (surrounding information) related to surroundings of the vehicle acquired from a sensor, such as a camera and a radar (for example, a laser radar or a millimeter-wave radar). On the other hand, in manual driving mode, a driver controls traveling of the vehicle similarly to conventional vehicles. Specifically, in manual driving mode, traveling of the vehicle is controlled by the driver, based on the driver's operation (on the steering, the accelerator, and the brakes), and the vehicle system autonomously executes neither the control of the steering nor the control of the accelerator and the brakes. Not only self-driving vehicles but also conventional vehicles that are not configured to travel in self-driving mode can be classified by driving modes according to, for example, how they are controlled.

It is expected that a vehicle traveling in self-driving mode (hereinafter, referred to as an "self-driving vehicle" as appropriate) and a vehicle traveling in manual driving mode (hereinafter, referred to as a "manual driving vehicle" as appropriate) coexist on a public road in the future.

As an example of automated driving, Patent Literature 1 discloses a system allowing a vehicle to follow the preceding vehicle in an automated manner. In the system, the vehicle and the preceding vehicle are each equipped with an illumination system. Character-based information for preventing other vehicles from cutting in between the vehicle and the preceding vehicle is displayed on the illumination system of the preceding vehicle, and character-based information for informing surroundings that the vehicle is following the preceding vehicle in an automated manner is displayed on the illumination system of the vehicle.

CITATION LIST

Patent Literature

Patent Literature 1: JP-H09-277887A

SUMMARY

Technical Problems

Development of automated driving requires substantial growth in a limit to how far a vehicle can detect its surroundings. A plurality of different types of sensors (for example, a camera, a LiDAR unit, and a millimeter-wave radar) mounted on a vehicle is expected to expand the limit. In this respect, for example, a LiDAR unit or an infrared camera can be installed in the front and the rear of a vehicle.

If an infrared camera is mounted on a vehicle, a source module configured to emit infrared rays or, in particular, an infrared laser outside the vehicle is used. It has been confirmed, however, that, if an infrared laser emitter including a plurality of surface-emitting laser elements arranged in a two-dimensional array is included in the source module, the strength of an emitted infrared laser fluctuates greatly depending on peripheral temperature of the infrared laser emitter. In this case, detection accuracy of the infrared camera or an infrared sensor deteriorates due to the dependence of the strength on temperature. Therefore, there is room for consideration in a vehicular light source system for reducing the dependence of the strength of an emitted laser, such as an infrared laser, on temperature.

In addition, it has been confirmed that, if an edge-emitting infrared laser emitter is included in the source module, the peak oscillation wavelength of an emitted infrared laser fluctuates greatly depending on peripheral temperature of the infrared laser emitter. In this case, as a concession to a fluctuation in the peak oscillation wavelength, required is a band-pass filter having a wide bandwidth, which is provided before an infrared camera. Such a band-pass filter having a wide bandwidth is, however, responsible for deterioration of the signal-to-noise ratio (S/N) of a signal output from the infrared camera, thereby deteriorating the detection accuracy. Therefore, there is room for consideration in a vehicular light source system for reducing the dependence of the peak oscillation wavelength of an emitted laser, such as an infrared laser, on temperature.

An object of the present disclosure is to provide a vehicular light source system capable of reducing dependence of the strength of an emitted laser on temperature. Another object of the present disclosure is to provide a vehicular light source system capable of reducing dependence of the peak oscillation wavelength of an emitted laser on temperature.

Solution to Problems

A vehicular light source system mountable on a vehicle according to an aspect of the present disclosure includes:
    a first laser emitter configured to emit a first laser outside the vehicle;
    a second laser emitter configured to emit a second laser outside the vehicle;
    a thermometer configured to measure peripheral temperature of at least one of the first and the second laser emitters; and
    a light source controller configured to control the first and the second laser emitters, based on relation of the peripheral temperature to a threshold temperature, in which
    the strength of the first laser at a temperature lower than the threshold temperature is higher than that of the second laser at the temperature lower than the threshold temperature, the strength of the first laser at a temperature higher than the threshold temperature is lower than that of the second laser at the temperature higher than the threshold temperature, and the light source controller is configured to control the first and the second laser emitters such that:

the strength of the first laser becomes higher than that of the second laser if the peripheral temperature is lower than the threshold temperature; and the strength of the second laser becomes higher than that of the first laser if the peripheral temperature is higher than or equal to the threshold temperature.

According to the above configuration, the strength of the first laser becomes higher than that of the second laser if the peripheral temperature is lower than the threshold temperature; and the strength of the second laser becomes higher than that of the first laser is if the peripheral temperature is higher than or equal to the threshold temperature. Accordingly, it becomes possible to provide a vehicular light source system capable of reducing the dependence of the intensity of an emitted laser on temperature even if the strength of the first and the second lasers greatly fluctuates due to fluctuation in the peripheral temperature.

A vehicular light source system mountable on a vehicle according to another aspect of the present disclosure includes:

a first laser emitter configured to emit a first laser outside the vehicle;

a second laser emitter configured to emit a second laser outside the vehicle;

a thermometer configured to measure peripheral temperature of at least one of the first and the second laser emitters; and a light source controller configured to turn on one of the first and the second laser emitters and turn off the other one of the first and the second laser emitters, based on relation of the peripheral temperature to a threshold temperature, in which the peak oscillation wavelength of the first laser is longer than that of the second laser.

the peak oscillation wavelengths of the first and the second lasers fluctuate depending on the peripheral temperature, and the light source controller is configured to:

turn on the first laser emitter and turn off the second laser emitter if the peripheral temperature is lower than the threshold temperature; and turn off the first laser emitter and turn on the second laser emitter if the peripheral temperature is higher than or equal to the threshold temperature.

According to the above configuration, the first laser emitter is turned on and the second laser emitter is turned off if the peripheral temperature is lower than the threshold temperature; and the first laser emitter is turned off and the second laser emitter is turned on if the peripheral temperature is higher than or equal to the threshold temperature. Accordingly, it becomes possible to reduce the dependence of the peak oscillation wavelength of a laser emitted from the vehicular light source system even if the peak oscillation wavelengths of the first and the second lasers greatly fluctuate due to fluctuation in the peripheral temperature.

BRIEF DESCRIPTION OF DRAWINGS

FIG. 2 is a block diagram of the vehicle system including a front vehicular sensing system and a rear vehicular sensing system.

FIG. 13 is a flowchart of on-off control of the first and the second laser emitters according to a modification of the second embodiment.

DESCRIPTION OF EMBODIMENTS

First Embodiment

Figure 1:
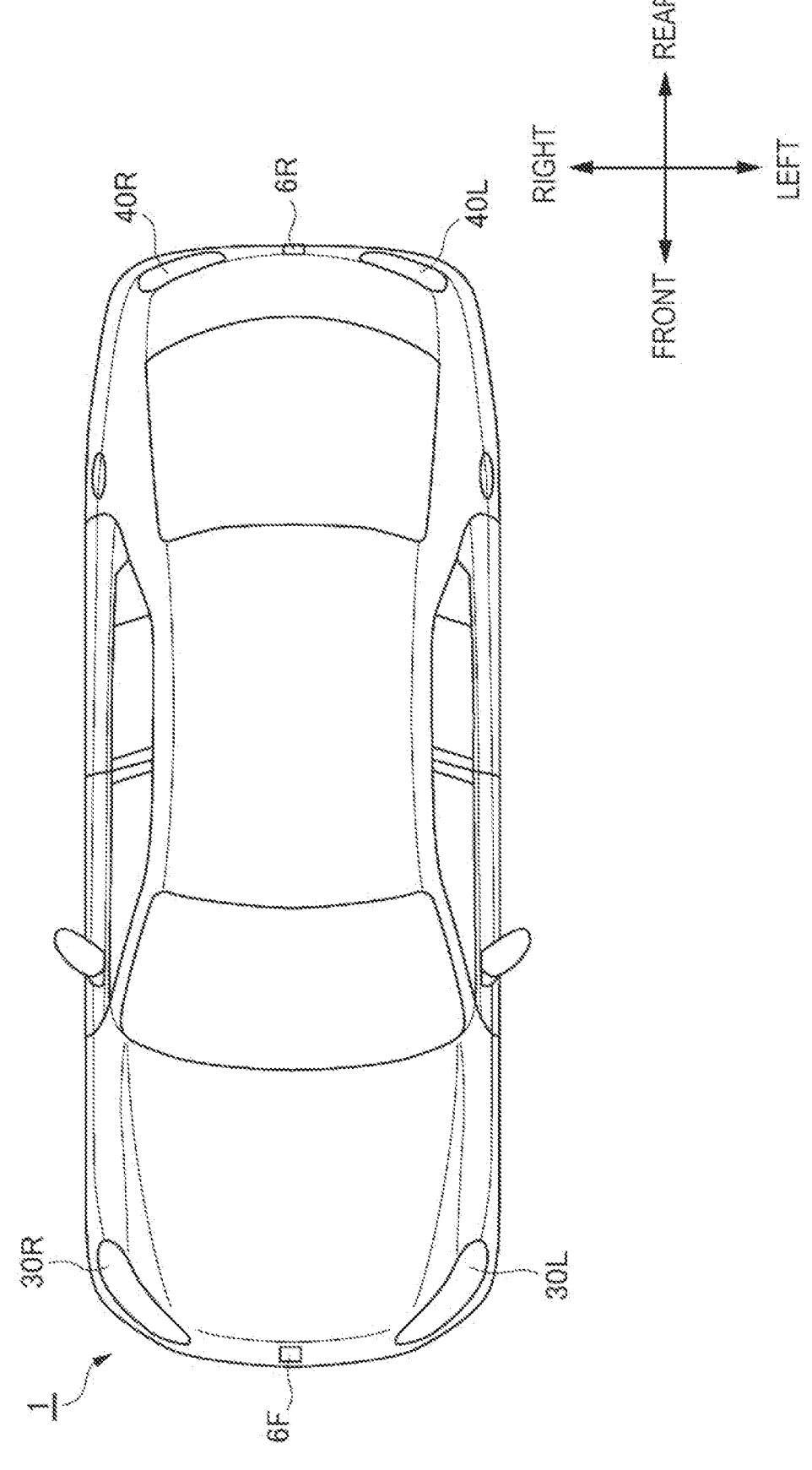
FIG. 1 is a top view of a vehicle including a vehicle system.

In the following, a first embodiment will be described with reference to the drawings. Dimensions of respective components shown in the drawings may be different from the actual dimensions for the sake of convenience.

A "left-right direction," an "up-down direction" and a "front-rear direction" may be referred to as appropriate for the sake of convenience. These directions are relative directions with respect to a vehicle 1 shown in FIG. 1. The "left-right direction" includes a "leftward direction" and a "rightward direction." The "up-down direction" includes an "upward direction" and a "downward direction." The "front-rear direction" includes a "forward direction" and a "rearward direction." Although not shown in FIG. 1, the up-down direction is orthogonal to the left-right and the front-rear directions.

Figure 2:
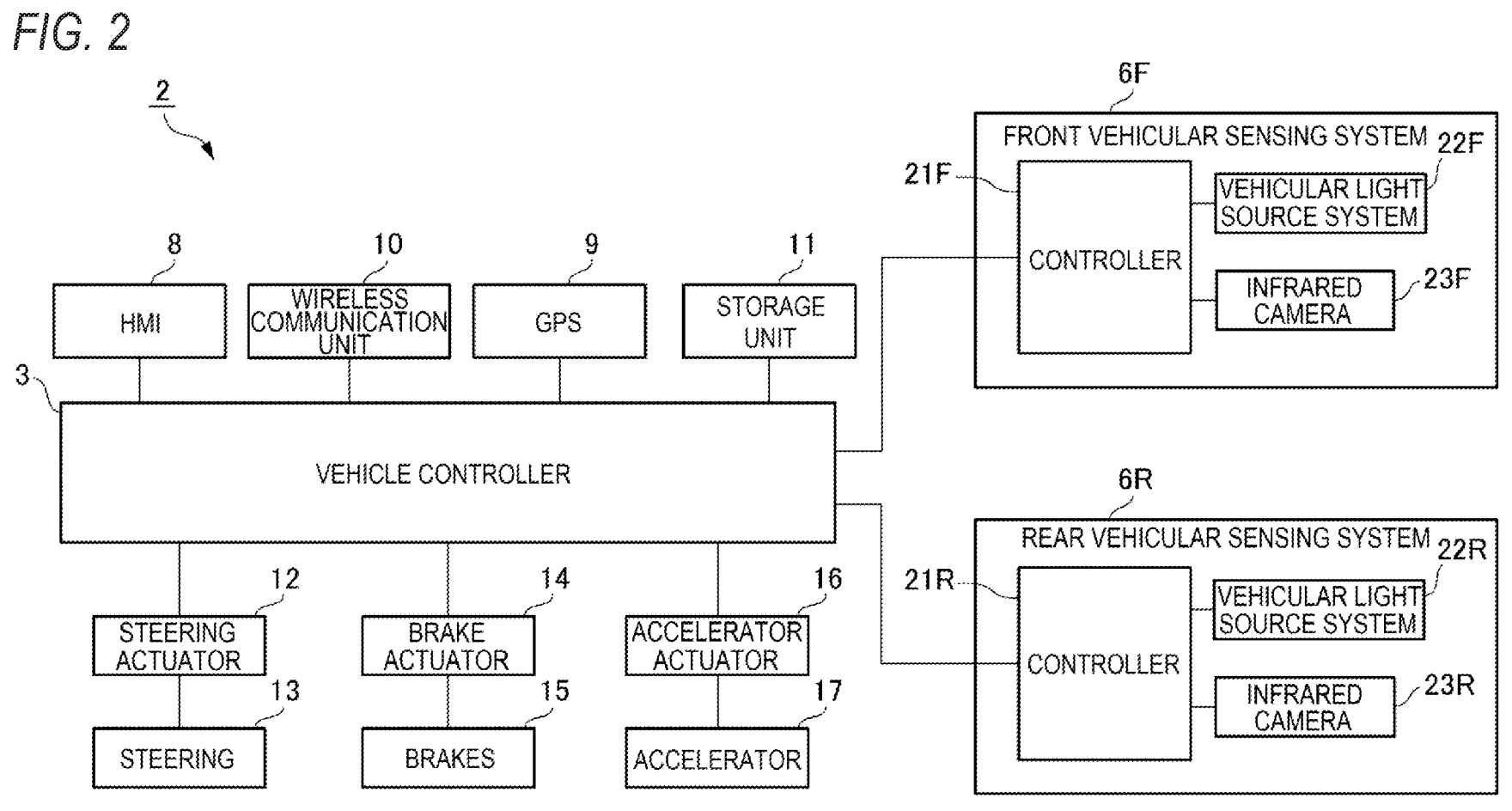

First, a vehicle system 2 according to the present embodiment will be described below with reference to FIGS. 1 and 2. FIG. 1 is a top view of the vehicle 1 including the vehicle system 2. FIG. 2 is a block diagram of the vehicle system 2. The vehicle 1 is a vehicle (an automobile) configured to travel in self-driving mode.

As shown in FIG. 2, the vehicle system 2 includes a vehicle controller 3, a front vehicular sensing system 6F (hereinafter, simply referred to as a "sensing system 6F"), and a rear vehicular sensing system 6R (hereinafter, simply referred to as a "sensing system 6R"). The vehicle system 2 further includes a human-machine interface (HMI) 8, a global positioning system (GPS) 9, a wireless communication unit 10, and a storage unit 11. The vehicle system 2 further includes a steering actuator 12, steering 13, a brake actuator 14, brakes 15, an accelerator actuator 16, and an accelerator 17.

The vehicle controller 3 is configured to control traveling of the vehicle 1. The vehicle controller 3 includes, for example, at least one electronic control unit (ECU). The electronic control unit includes: a computer system (for example, a system on a chip (SoC)) including one or more processors and one or more memories; and electronic circuitry including passive elements and active elements, such as transistors. The processors at least includes, for example, a central processing unit (CPU), a micro processing unit (MPU), a graphics processing unit (GPU), or a tensor processing unit (TPU). The CPU may include a plurality of CPU cores, and the GPU may include a plurality of GPU cores. Memories include read-only memories (ROMs) and random-access memories (RAMs). A ROM may store vehicle control programs. For example, the vehicle control programs may include an artificial intelligence (AI) program for self-driving. The AI program refers to a program (a trained model) implemented by supervised or unsupervised machine learning (in particular, deep learning) using a multi-layer neural network. ARAM may temporarily store vehicle control programs, vehicle control data, and/or surrounding information, which relates to surroundings of the vehicle. A processor may load a program specified by various vehicle control programs stored in the ROM onto the RAM to execute a variety of processing in cooperation with the RAM. The computer system may be configured with a non-von Neumann computer, such as an application-specific integrated circuit (ASIC) and a field-programmable gate array (FPGA). Further, the computer system may be configured with a combination of a von Neumann computer and a non-von Neumann computer.

The sensing system 6F is installed in the front of the vehicle 1. The sensing system 6F may be installed on a front grill or a front bumper or may be installed in a left headlamp 30L and/or a right headlamp 30R (see FIG. 1). The sensing system 6F includes a controller 21F, an infrared camera 23F (an example of an infrared sensor), and a vehicular light source system 22F.

The controller 21F is configured to control the vehicular light source system 22F and the infrared camera 23F. The controller 21F includes: a computer system including one or more processors and one or more memories; and electronic circuitry including passive elements and active elements, such as transistors. The controller 21F is configured, for example, to transfer infrared image data acquired from the infrared camera 23F to the vehicle controller 3. When the controller 21F determines that surroundings of the vehicle 1 is light based on illuminance data acquired from an illuminometer (not shown) mounted on the vehicle 1 (specifically, when acquired illuminance is higher than a threshold illuminance), the controller 21F may cause the vehicular light source system 22F not to operate, whereas, when the controller 21F determines that surroundings of the vehicle 1 is dark based on the illuminance data (specifically, when the acquired illuminance is lower than or equal to the threshold illuminance), the controller 21F may cause the vehicular light source system 22F to operate.

The infrared camera 23F is configured to acquire the infrared image data for front surroundings of the vehicle 1. The infrared camera 23F includes an infrared image sensor (an example of the infrared sensor). The infrared image sensor includes, for example, a charge-coupled device (CCD) or a complementary metal-oxide-semiconductor (CMOS). The infrared camera 23F is configured to transmit the acquired infrared image data to the vehicle controller 3 via the controller 21F. The vehicle controller 3 is configured to extract the surrounding information from the received infrared image data. The surrounding information may include information relating to objects (pedestrians, other vehicles, traffic signs, or the like) outside the vehicle 1. For example, the surrounding information may include information relating to attributes of the objects and information relating to the distance to the objects from the vehicle 1 or the direction of the objects with respect to the vehicle 1. The infrared camera 23F may be a monocular camera or a stereo camera.

The vehicular light source system 22F (hereinafter, simply referred to as a "light source system 22F") is configured to emit an infrared laser (specifically, a near-infrared laser) ahead of the vehicle 1. The peak oscillation wavelength of the infrared laser emitted from the light source system 22F is, for example, in the range of 800-00) nm. The peak oscillation wavelength is, for example, around 850 nm. After the infrared laser that has been emitted from the light source system 22F hits an object, such as another vehicle outside the vehicle 1, the infrared laser can be reflected by the object to the infrared camera 23F. In this manner, the infrared laser emitted from the light source system 22F enables accurate detection of an object around the vehicle 1 at night, based on the infrared image data. Therefore, in order to prevent deterioration of the detection accuracy of the infrared camera 23F, it is important to enhance reliability of not only the infrared camera 23F but also the light source system 22F, which is a source of infrared rays.

Figure 3:
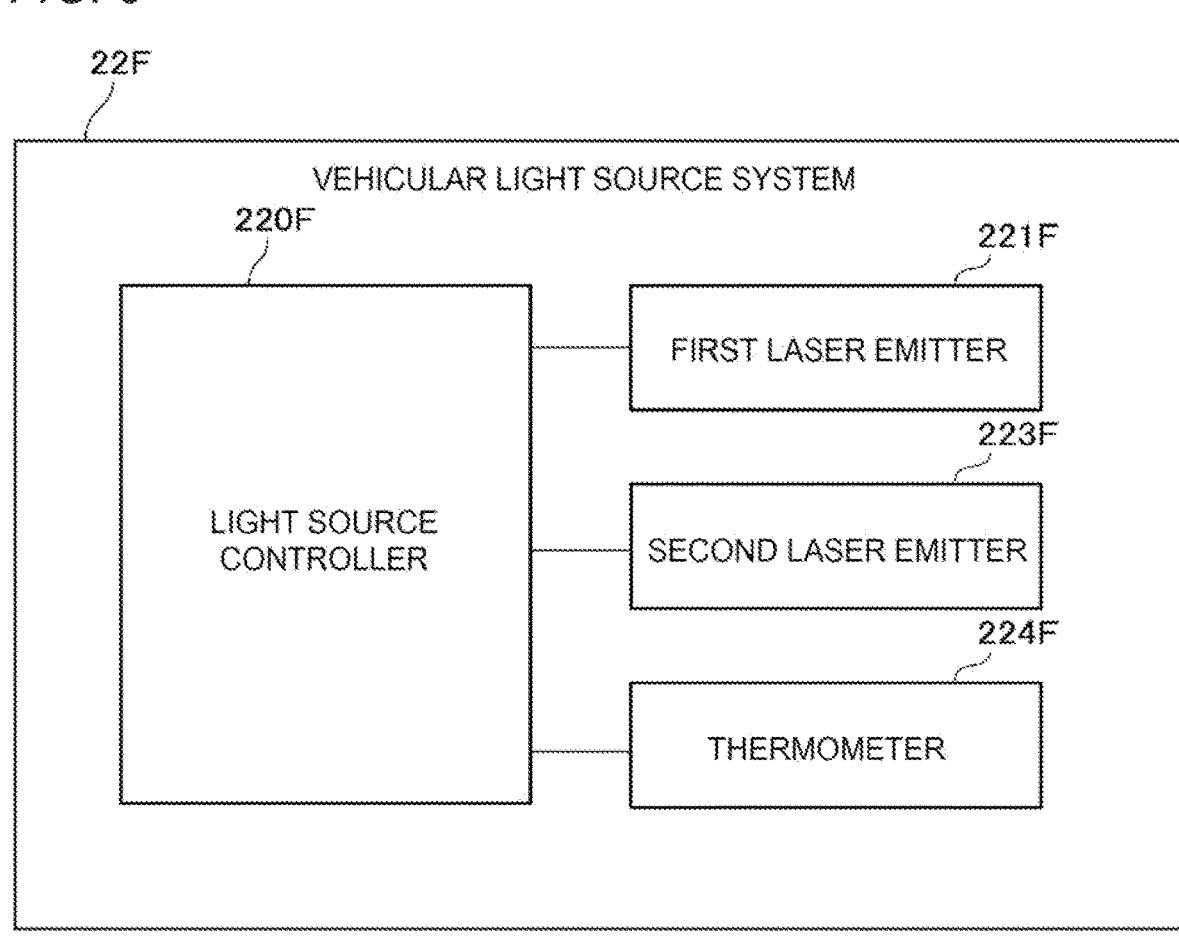
FIG. 3 is a block diagram of a vehicular light source system according to a first embodiment of the present disclosure.

Next, the light source system 22F will be described in detail with reference to FIG. 3. As shown in FIG. 3, the light source system 22F includes a first laser emitter 221F, a second laser emitter 223F, a thermometer 224F, and a light source controller 220F.

Figure 6:
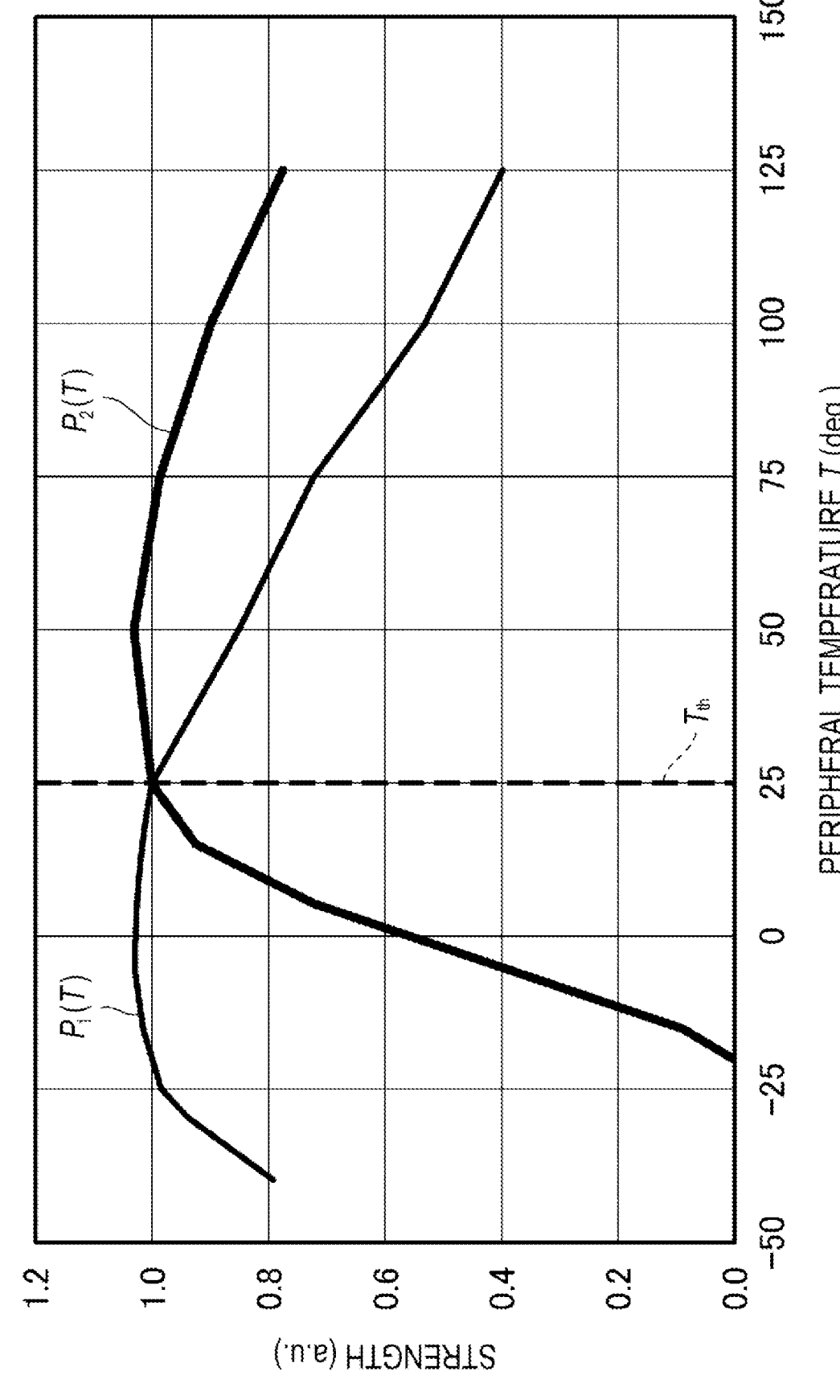
FIG. 6 is a graph showing dependence of the strength of a first infrared laser emitted from the first laser emitter on temperature and dependence of the strength of a second infrared laser emitted from the second laser emitter on temperature.

The first laser emitter 221F is configured to emit a first infrared laser outside the vehicle 1. As shown in FIG. 6, the strength $P_1$ of the first infrared laser emitted from the first laser emitter 221F fluctuates depending on peripheral temperature T. That is, the strength $P_1$ is dependent on temperature. In general, as the peripheral temperature T rises, the strength $P_1$ falls. The first laser emitter 221F may be, for example, a semiconductor laser emitter configured to emit an infrared laser. Specifically, the first laser emitter 221F may include a plurality of surface-emitting laser elements arranged in a two-dimensional array. The number of the surface-emitting laser elements of the first laser emitter 221F is, for example, 1000. Due to structure of surface-emitting laser elements, the strength of an infrared laser emitted from such laser elements greatly fluctuates depending on the peripheral temperature T.

The second laser emitter 223F is configured to emit a second infrared laser outside the vehicle 1. As shown in FIG.

6, the strength $P_2$ of the second infrared laser emitted from the second laser emitter 223F fluctuates depending on the peripheral temperature T. That is, the strength $P_2$ is dependent on temperature. In general, as the peripheral temperature T falls, the strength $P_2$ falls. The second laser emitter 223F may be, for example, a semiconductor laser emitter configured to emit an infrared laser. Specifically, the second laser emitter 223F may include a plurality of surface-emitting laser elements arranged in a two-dimensional array. The number of the surface-emitting laser elements of the second laser emitter 223F is, for example, 1000.

The thermometer 224F is configured to measure the peripheral temperature T of at least the first laser emitter 221F or the second laser emitter 223F. The thermometer 224F is, for example, a thermistor. The thermometer 224F may be installed, for example, in the vicinity of the first laser emitter 221F and/or the second laser emitter 223F or may be installed in the sensing system 6F shown in FIG. 4.

The light source controller 220F is configured to control the first laser emitter 221F and the second laser emitter 223F. Specifically, the light source controller 220F is configured to receive a signal indicating the peripheral temperature T from the thermometer 224F to control the first laser emitter 221F and the second laser emitter 223F, based on relation of the peripheral temperature T to a threshold temperature $T_{th}$ described later. The light source controller 220F may include, for example, a microcontroller and/or analog control circuitry. The microcontroller may include a processor, such as a CPU, and a memory including a ROM and a RAM. The analog control circuitry may include passive elements and active elements including a switching element, such as a metal-oxide-semiconductor field-effect transistor (MOS-FET).

Next, the sensing system 6R will be described with reference to FIG. 2. The sensing system 6R is installed in the rear of the vehicle 1. The sensing system 6R may be installed on a rear bumper or may be installed in a left rear combination lamp 40L and/or a right rear combination lamp 40R (see FIG. 1). The sensing system 6R includes a controller 21R, an infrared camera 23R, and a vehicle light source system 22R. The controller 21R is configured to control the vehicle light source system 22R and the infrared camera 23R. The controller 21R may be configured similarly to the controller 21F described above.

The infrared camera 23R is configured to acquire the infrared image data for rear surroundings of the vehicle 1. The infrared camera 23R may be configured similarly to the infrared camera 23F described above. The vehicle light source system 22R (hereinafter, simply referred to as a "light source system 22R") is configured to emit an infrared laser (specifically, a near-infrared laser) behind the vehicle 1. The peak oscillation wavelength of the infrared laser emitted from the light source system 22R is, for example, in the range of 800-1000 nm. The peak oscillation wavelength is, for example, around 850 nm. The light source system 22R may be configured similarly to the light source system 22F shown in FIG. 3.

The HMI 8 shown in FIG. 2 includes an input unit configured to receive driver's input operation and an output unit configured to provide the driver with traveling information or the like. The input unit includes a steering wheel, an accelerator pedal, a brake pedal, a driving mode switch for switching the vehicle 1 between driving modes, and the like. The output unit is a display (for example, a head-up display (HUD)) configured to display a variety of traveling information. The GPS 9 is configured to acquire location information, which relates to current location of the vehicle 1, and to output the acquired location information to the vehicle controller 3.

The wireless communication unit 10 is configured to receive information (for example, traveling information) related to other vehicles around the vehicle 1 from other vehicles and to transmit information (for example, traveling information) related to the vehicle 1 to other vehicles (vehicle-to-vehicle communication). The wireless communication unit 10 is also configured to receive infrastructure information from infrastructure facilities, such as traffic lights and traffic signs, and to transmit the traveling information of the vehicle 1 to infrastructure facilities (vehicle-to-infrastructure communication). The wireless communication unit 10 is further configured to receive information related to pedestrians from portable electronic devices (a smart phone, a tablet, a wearable device, and the like) carried by them and to transmit the traveling information of the vehicle 1 to portable electronic devices (vehicle-to-pedestrian communication). The vehicle 1 may communicate with other vehicles, infrastructure facilities, portable electronic devices directly in an ad-hoc mode or via a communication network, such as the Internet.

The storage unit 11 is an external storage device, such as a hard disk drive (HDD) and a solid-state drive (SSD). The storage unit 11 may store two- or three-dimensional map data and/or vehicle control programs. For example, the three-dimensional map data may be implemented by three-dimensional point clouds. The storage unit 11 is configured to output the map data or the vehicle control programs to the vehicle controller 3 in response to a request from the vehicle controller 3. The map data and the vehicle control programs may be updated using the wireless communication unit 10 and a communication network.

When the vehicle 1 travels in self-driving mode, the vehicle controller 3 autonomously generates at least a steering control signal, an accelerator control signal, and a brake control signal, based on, for example, the traveling information, the surrounding information, the location information, and the map data. The steering actuator 12 is configured to control the steering 13, based on the steering control signal received from the vehicle controller 3. The brake actuator 14 is configured to control the brakes 15, based on the brake control signal received from the vehicle controller 3. The accelerator actuator 16 is configured to control the accelerator 17, based on the accelerator control signal received from the vehicle controller 3. In this manner, the vehicle controller 3 is configured to control traveling of the vehicle 1, based on, for example, the traveling information, the surrounding information, the location information, and the map data autonomously. That is, in self-driving mode, traveling of the vehicle 1 is autonomously controlled by the vehicle system 2.

On the other hand, when the vehicle 1 travels in manual driving mode, the vehicle controller 3 generates the steering control signal, the accelerator control signal, and the brake control signal in accordance with the driver's manual operation on the accelerator pedal, the brake pedal, and the steering wheel. In manual driving mode, since the steering control signal, the accelerator control signal, and the brake control signal are generated, based on the driver's manual operation in this manner, traveling of the vehicle 1 is controlled by the driver.

Figure 4:
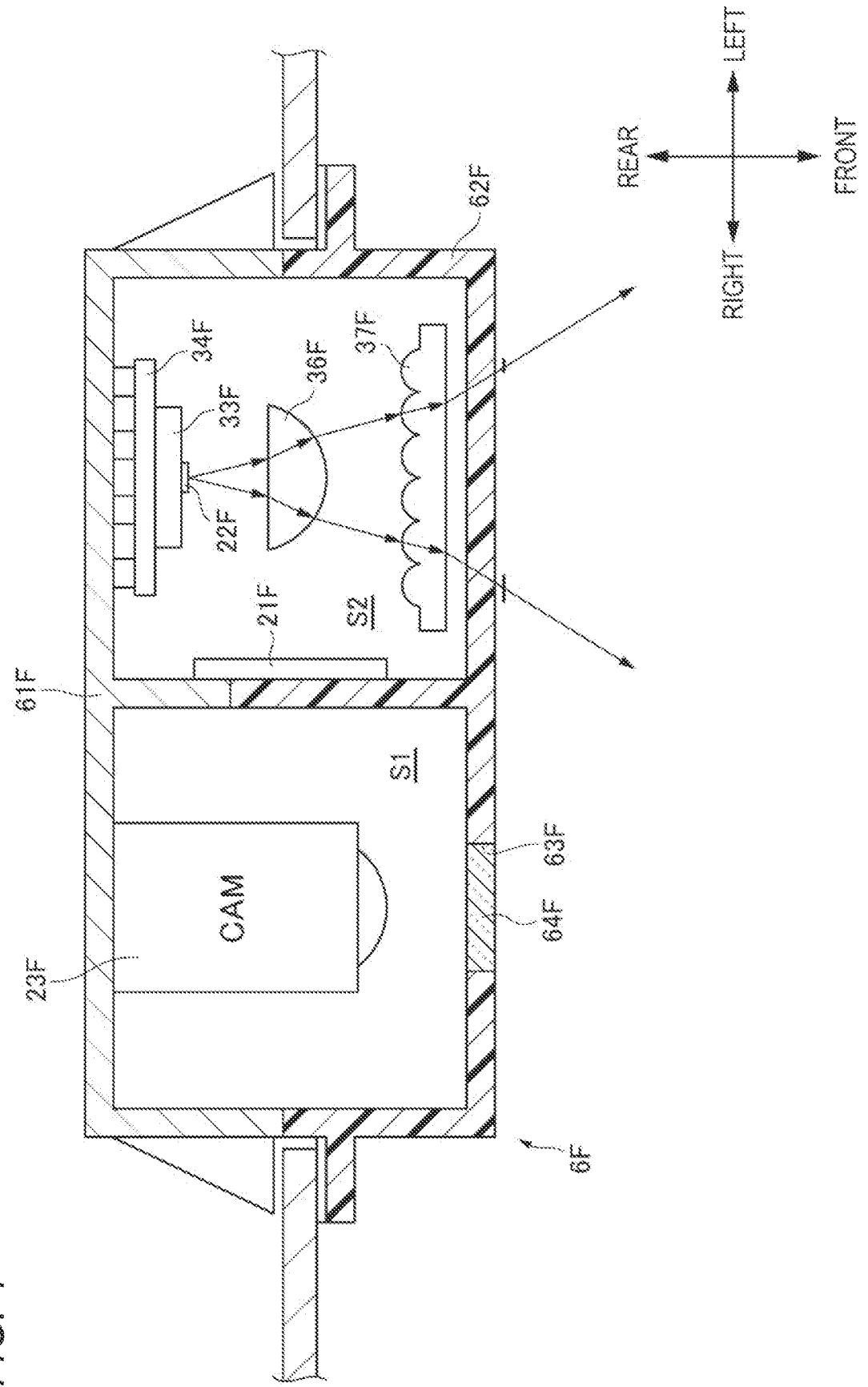
FIG. 4 is a schematic horizontal cross-sectional view of the front vehicular sensing system installed in the front of the vehicle.

Next, an example of a specific structure of the sensing system 6F will be described below with reference to FIG. 4. FIG. 4 is a schematic horizontal cross-sectional view of the sensing system 6F installed in the front of the vehicle 1. The sensing system 6R may be configured similarly to the sensing system 6F shown in FIG. 4.

As shown in FIG. 4, in the sensing system 6F, the infrared camera 23F, the light source system 22F, and the controller 21F are placed in a space formed by a housing 61F, which has an opening, and a cover 62F. Specifically, the space formed by the housing 61F and the cover 62F includes a first space S1 and a second space S2, which is separated from the first space S1. The infrared camera 23F is placed in the first space S1, whereas the light source system 22F and the controller 21F are placed in the second space S2. According to the above configuration, since the first space S1 and the second space S2 are separated from each other, the infrared laser that has been emitted from the light source system 22F is seldom directly received by the infrared camera 23F, thereby enhancing reliability of the infrared image data generated by the infrared camera 23F.

In the light source system 22F, the light source controller 220F, the first laser emitter 221F, the second laser emitter 223F, and the thermometer 224F may be mounted on a circuit board (not shown). The light source system 22F is mounted on a mount 33F, and the mount 33F is mounted on a heat sink 34F. Heat from the light source system 22F is diffused into air in the second space S2 via the mount 33F and the heat sink 34F. The infrared laser that has been emitted from the light source system 22F enters a projection lens 36F and is then refracted by the projection lens 36F. Thereafter, the infrared laser that has penetrated the projection lens 36F is diffused by a diffusion lens 37F and is then emitted outside. In this manner, the projection lens 36F and the diffusion lens 37F can widen coverage of the infrared laser, which has great directivity.

Formed in the cover 62F is a through hole 63F, which faces the infrared camera 23F. The through hole 63F is filled with a filter 64F, which is pervious only to infrared rays. The filter 64F is placed before the infrared camera 23F such that the infrared camera 23F receives only infrared rays. Specifically, the filter 64F is pervious only to the first infrared laser emitted from the first laser emitter 221F and the second infrared laser emitted from the second laser emitter 223F. Since the filter 64F, which is a band-pass filter pervious only to infrared rays, is placed before the infrared camera 23F in this manner, deterioration of the S/N of an image signal output from the infrared camera 23F can be preferably prevented, thereby enhancing reliability of the infrared image data. In this regard, it is preferable to narrow the bandwidth of the filter 64F for enhancing the S/N.

On-Off Control of Laser Emitters According to Present Embodiment

Figure 5:
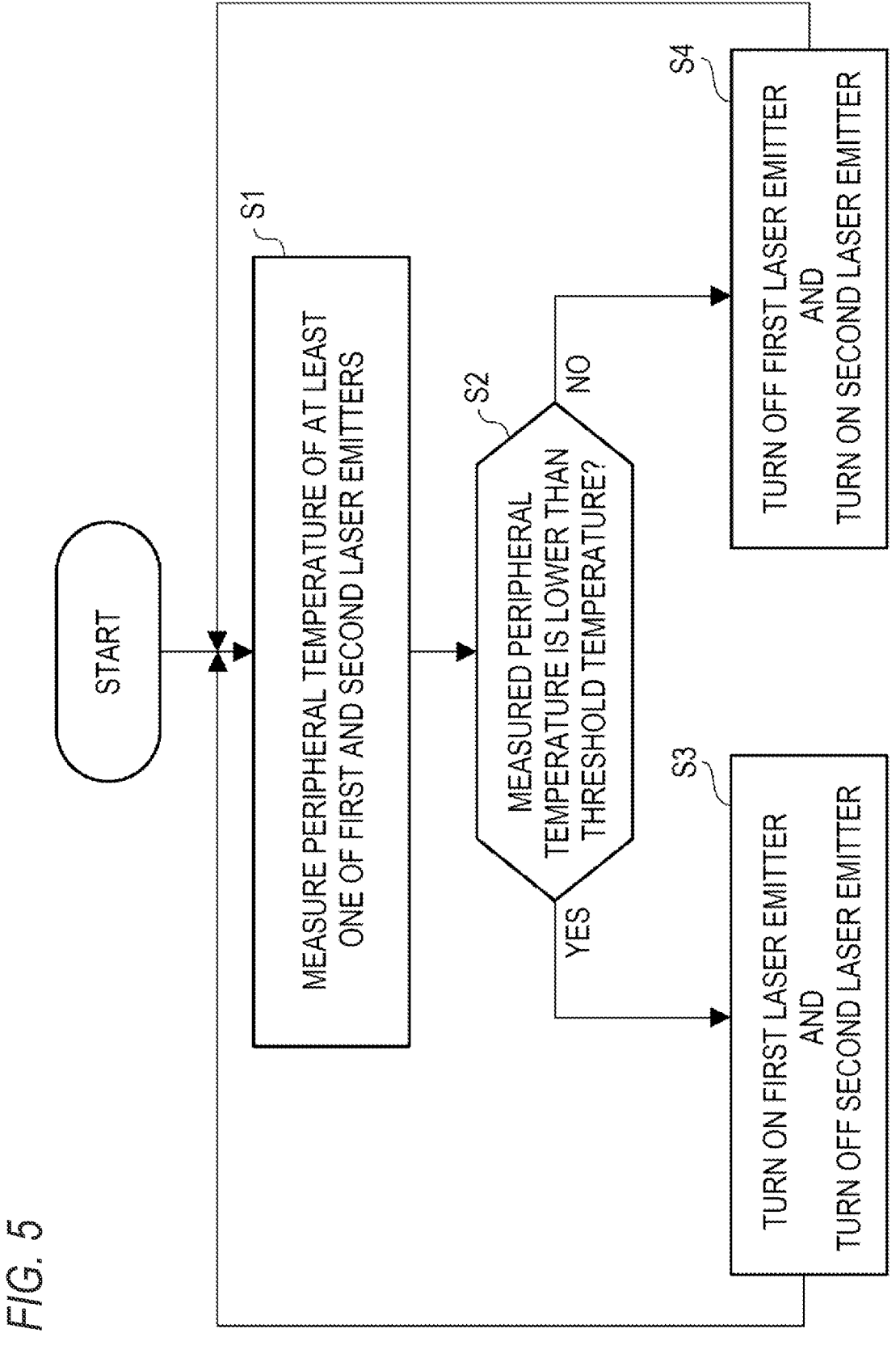
FIG. 5 is a flowchart of on-off control of a first laser emitter and a second laser emitter according to the first embodiment.

Next, on-off control of the first laser emitter 221F and the second laser emitter 223F according to the present embodiment will be described below with reference to FIGS. 5 and 6. FIG. 5 is a flowchart of the on-off control of the first laser emitter 221F and the second laser emitter 223F. FIG. 6 is a graph showing dependence of the strength $P_1$ of the first infrared laser emitted from the first laser emitter 221F on temperature and dependence of the strength $P_2$ of the second infrared laser emitted from the second laser emitter 223F on temperature.

The light source system 22F according to the present embodiment includes the first laser emitter 221F and the second laser emitter 223F. The strength $P_1$ is high at low temperatures, whereas the strength $P_2$ is high at high temperatures. The first laser emitter 221F and the second laser emitter 223F are turned on or off based on the peripheral temperature T.

As shown in FIG. 5, in step S1, the thermometer 224F measures the peripheral temperature T of at least the first laser emitter 221F or the second laser emitter 223F and then transmits a signal indicating the peripheral temperature T to the light source controller 220F. Next, in step S2, the light source controller 220F receives the signal indicating the peripheral temperature T from the thermometer 224F and then determines whether the peripheral temperature T is lower than the threshold temperature $T_{th}$ or not. As shown in FIG. 6, the threshold temperature $T_{th}$ is a temperature at which the curves of $P_1(T)$ and $P_2(T)$ intersect. In this example, the threshold temperature $T_{th}$ is 25° C. The threshold temperature $T_{th}$ is not limited to the temperature at which the two curves $P_1(T)$ and $P_2(T)$ intersect and may be a temperature around that temperature.

As shown in FIG. 6, if the peripheral temperature T is lower than the threshold temperature $T_{th}$, the strength $P_1(T)$ becomes higher than the strength $P_2(T)$. On the other hand, if the peripheral temperature T is higher than the threshold temperature $T_{th}$, the strength $P_1(T)$ becomes lower than the strength $P_2(T)$.

Next, if the light source controller 220F determines that the peripheral temperature T is lower than the threshold temperature $T_{th}$ (YES at step S2), the light source controller 220F turns on the first laser emitter 221F and turns off the second laser emitter 223F (step S3). On the other hand, if the light source controller 220F determines that the peripheral temperature T is higher than or equal to the threshold temperature $T_{th}$ (NO at step S2), the light source controller 220F turns off the first laser emitter 221F and turns on the second laser emitter 223F (step S4). These steps may be repeated as appropriate.

According to the present embodiment, if the peripheral temperature T is lower than the threshold temperature $T_{th}$, the first laser emitter 221F is turned on, whereas the second laser emitter 223F is turned off. On the other hand, if the peripheral temperature T is higher than or equal to the threshold temperature $T_{th}$, the first laser emitter 221F is turned off, whereas the second laser emitter 223F is turned on. Accordingly, dependence of the strength of the infrared laser emitted from the light source system 22F can be reduced even if the strength of the first and the second infrared lasers greatly fluctuate due to fluctuation in the peripheral temperature T. As shown in FIG. 6, if the peripheral temperature T is higher than or equal to the threshold temperature $T_{th}$, the strength $P_1(T)$ falls as the peripheral temperature T rises. On the other hand, if the peripheral temperature T is lower than the threshold temperature $T_{th}$, the $P_2(T)$ falls as the peripheral temperature T falls. According to the present embodiment, since the first laser emitter 221F and the second laser emitter 223F are turned on or off based on the relation of the peripheral temperature T to the threshold temperature $T_{th}$, the dependence of the strength of the infrared laser emitted from the light source system 22F on temperature can be reduced.

In addition, according to the present embodiment, the threshold temperature $T_t$ is the temperature (25° C., in this example; hereinafter, referred to as an "intersection temperature") at which the curves of $P_1(T)$ and $P_2(T)$ intersect. Since the first laser emitter 221F and the second laser emitter 223F are turned on or off based on the relation of the peripheral temperature T to the threshold temperature $T_{th}$, which is equal to the intersection temperature, the dependence of the strength of the infrared laser emitted from the light source system 22F on temperature can be reduced.

Although the first laser device and the second laser device are turned on or off based on the relation of the peripheral temperature T to the threshold temperature $T_{th}$ the present embodiment is not limited thereto. For example, if the peripheral temperature T is lower than the threshold temperature $T_{th}$ the first laser emitter 221F and the second laser emitter 223F may be controlled such that the strength $P_1$ becomes higher than the strength $P_2$. Further, if the peripheral temperature T is higher than or equal to the threshold temperature $T_{th}$, the first laser emitter 221F and the second laser emitter 223F may be controlled such that the $P_2$ becomes higher than the strength $P_1$. In this case, if the peripheral temperature T is lower than the threshold temperature $T_{th}$, the first laser emitter 221F is supplied with current required for laser oscillation, whereas the second laser emitter 223F may be supplied with current lower than threshold for laser oscillation. Further, if the peripheral temperature T is higher than or equal to the threshold temperature $T_{th}$ the second laser emitter 223F is supplied with current required for laser oscillation, whereas the first laser emitter 221F may be supplied with current lower than threshold for laser oscillation.

Figure 7:
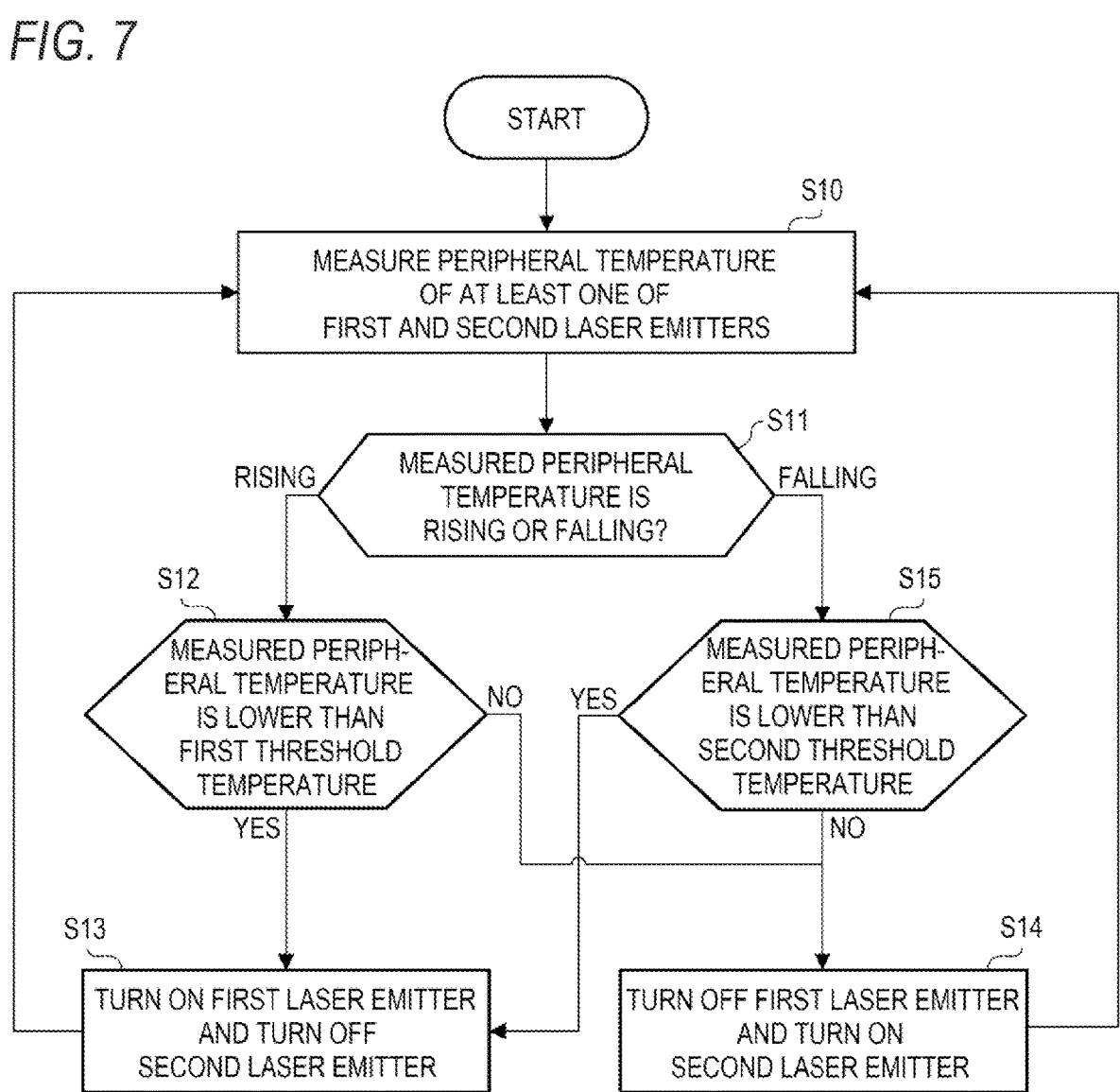
FIG. 7 is a flowchart of on-off control of the first and the second laser emitters according to a modification of the first embodiment.
Figure 8:
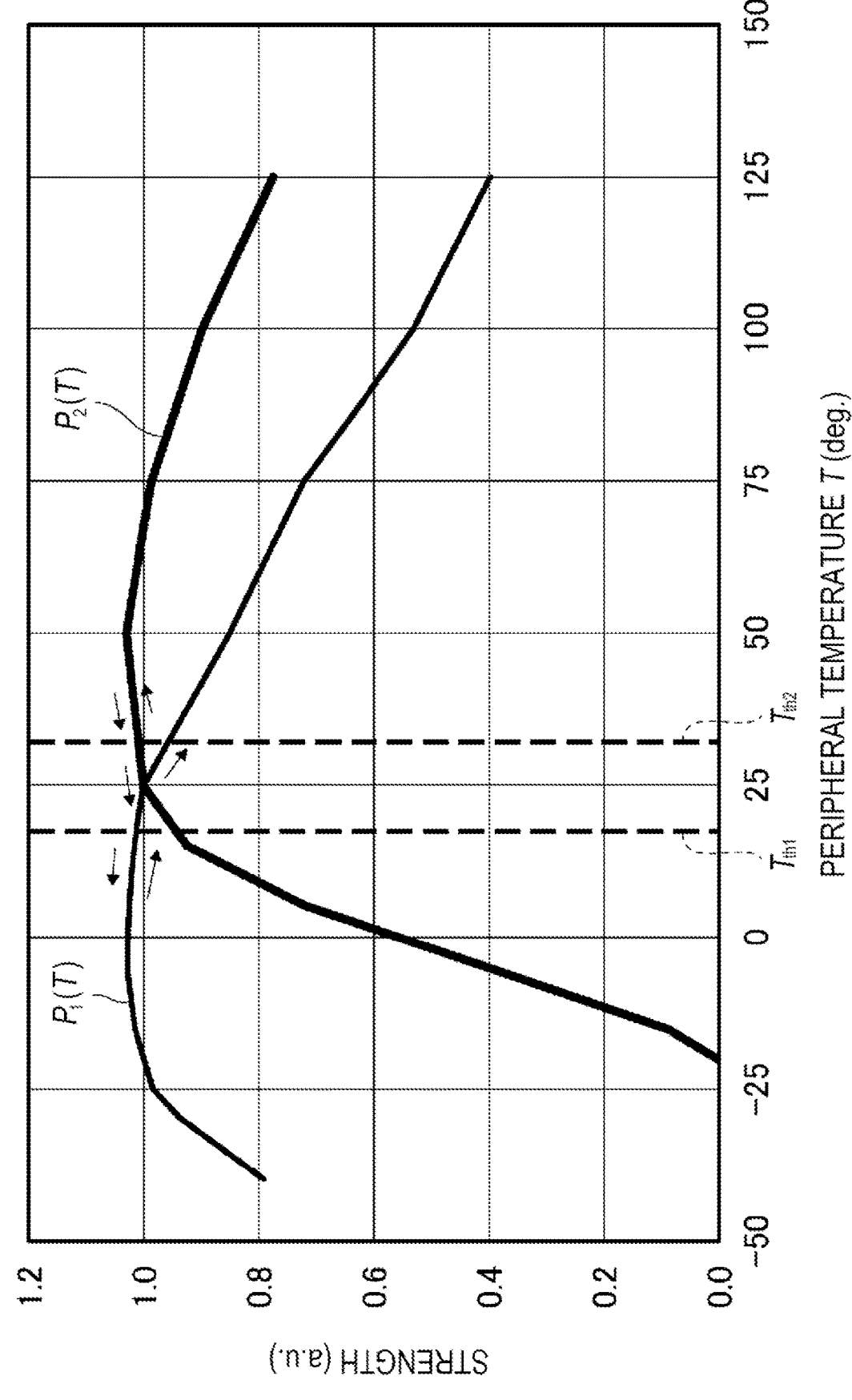
FIG. 8 is a graph showing dependence of the strength of the two infrared lasers on temperature, which is presented for explaining the on-off control of the first and the second laser emitters based on two threshold temperatures.

On-Off Control of Laser Emitters According to Modification of First Embodiment Next, on-off control of the first laser emitter 221F and the second laser emitter 223F according to a modification of the first embodiment will be described below with reference to FIGS. 7 and 8. FIG. 7 is a flowchart of the on-off control of the first laser emitter 221F and the second laser emitter 223F according to the modification. FIG. 8 is a graph showing dependence of the strength of the two infrared lasers on temperature, which is presented for explaining the on-off control of the first laser emitter 221F and the second laser emitter 223F based on two threshold temperatures $T_{th1}$ and $T_{th2}$.

The present modification is different from the first embodiment in that the first laser emitter 221F and the second laser emitter 223F are turned on or off based on relation of the two threshold temperatures $T_{th1}$ and $T_{th2}$ (see FIG. 8) to the peripheral temperature T. As shown in FIG. 8, it is assumed that the first threshold temperature $T_{th1}$ is higher than the second threshold temperature $T_{th2}$.

As shown in FIG. 7, in step S10, the thermometer 224F measures the peripheral temperature T of at least the first laser emitter 221F or the second laser emitter 223F and then transmits a signal indicating the peripheral temperature T to the light source controller 220F. Next, in step S11, the light source controller 220F receives the signal indicating the peripheral temperature T from the thermometer 224F and then determines whether the peripheral temperature T is rising or falling.

Thereafter, if the light source controller 220F determines that the peripheral temperature T is rising, the light source controller 220F determines whether the peripheral temperature T is lower than the first threshold temperature $T_{th1}$ or not (step S12). If the light source controller 220F determines that the peripheral temperature T is lower than the first threshold temperature $T_{th1}$ (YES at step S12), the light source controller 220F turns on the first laser emitter 221F and turns off the second laser emitter 223F (step S13). On the other hand, if the light source controller 220F determines that the peripheral temperature T is higher than or equal to the first threshold temperature $T_{th1}$ (NO at step S12), the light source controller 220F turns off the first laser emitter 221F and turns on the second laser emitter 223F (step S14).

If the light source controller 220F determines that the peripheral temperature T is falling, the light source controller 220F determines whether the peripheral temperature T is lower than the second threshold temperature $T_{th2}$, which is lower than the first threshold $T_{th1}$, or not (step S15). If the light source controller 220F determines that the peripheral temperature T is lower than the second threshold temperature $T_{th2}$ (YES at step S15), the light source controller 220F turns on the first laser emitter 221F and turns off the second laser emitter 223F (step S13). On the other hand, if the light source controller 220F determines that the peripheral temperature T is higher than or equal to the second threshold temperature $T_{th2}$ (NO at step S15), the light source controller 220F turns off the first laser emitter 221F and turns on the second laser emitter 223F (step S14). These steps may be repeated as appropriate.

According to the present modification, by the on-off control of the first laser emitter 221F and the second laser emitter 223F based on the relation of the two threshold temperatures $T_{th1}$ and $T_{th2}$ to the peripheral temperature T, hysteresis is imparted to the switching based on threshold. Accordingly, even if the peripheral temperature T oscillates quickly around the first threshold temperature $T_{th1}$ or the second threshold temperature $T_{th2}$, the first laser emitter 221F and the second laser 223F are preferably prevented from being turned on or off frequently.

Second Embodiment

Next, a light source system 122F according to a second embodiment will be described with reference to the drawings. Repeated descriptions of components having the same reference numerals as those in the first embodiment will be omitted.

Figure 9:
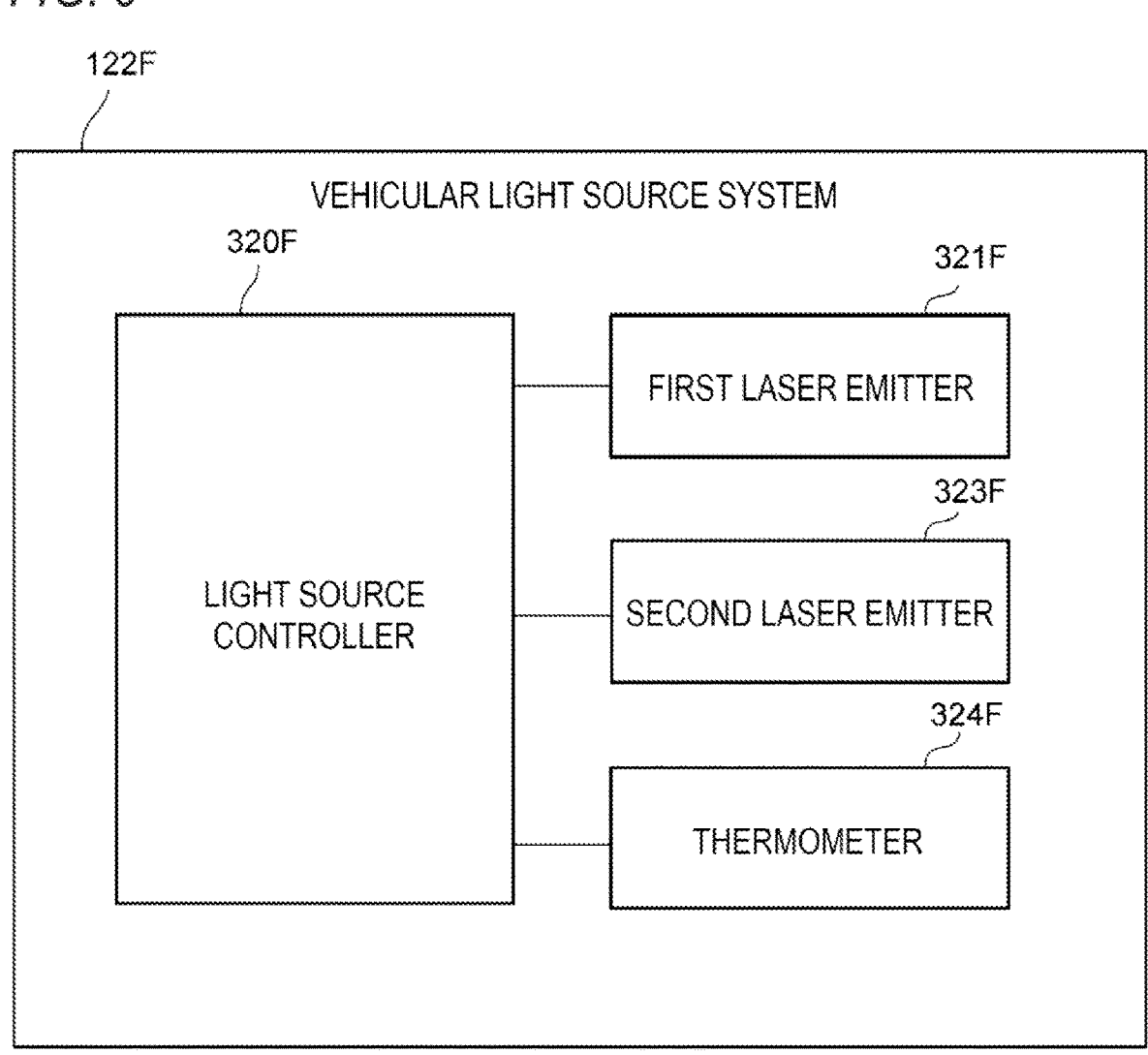
FIG. 9 is a block diagram of a vehicular light source system according to a second embodiment of the present disclosure.

First, the light source system 122F included in the sensing system 6F will be described in detail with reference to FIG. 9. As shown in FIG. 9, the light source system 122F according to the second embodiment includes a first laser emitter 321F, a second laser emitter 323F, a thermometer 324F, and a light source controller 320F.

In the first embodiment, the sensing system 6F shown in FIG. 2 includes light source system 22F, whereas, in the second embodiment, the sensing system 6F includes the light source system 122F. The functionality of the light source system 122F according to the second embodiment is different from that of the light source system 22F according to the first embodiment. In this regard, the second embodiment is different from the first embodiment. The sensing system 6R shown in FIG. 2 includes a light source system configured similarly to the light source system 122F.

Figure 12:
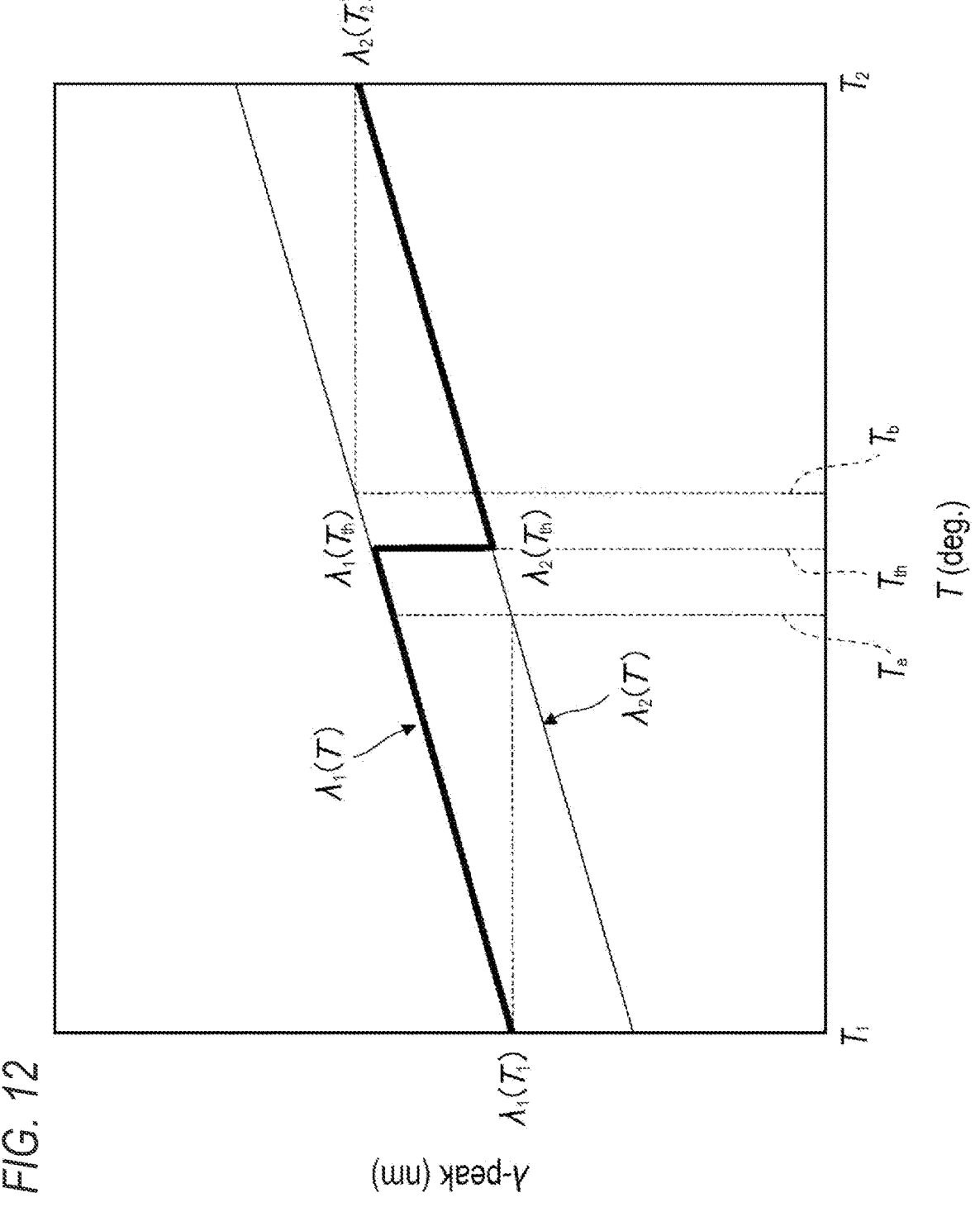
FIG. 12 is a graph showing dependence of the peak oscillation wavelength of a first infrared laser emitted from the first laser emitter and dependence of the peak oscillation wavelength of a second infrared laser emitted from the second laser emitter.

The first laser emitter 321F is configured to emit a first infrared laser outside the vehicle 1. As shown in FIG. 12, the peak oscillation wavelength $\lambda_1$ of the first infrared laser emitted from the first laser emitter 321F fluctuates depending on peripheral temperature T. That is, the peak oscillation wavelength $\lambda_1$ is dependent on temperature. Specifically, as the peripheral temperature T rises, the peak oscillation wavelength $\lambda_1$ rises. The dependence of the peak oscillation wavelength $\lambda_1$ on the peripheral temperature T may be expressed as, for example, the following Equation (1):

$$\lambda_1(T) = aT + \lambda_{01}, \qquad (1)$$

where a and $\lambda_{01}$ are constants.

The first laser emitter 321F may be, for example, a semiconductor laser emitter configured to emit an infrared laser. Specifically, the first laser emitter 321F may be a multi-longitudinal mode semiconductor laser emitter (for example, an edge-emitting Fabry-Pérot semiconductor laser emitter). Due to structure of multi-longitudinal mode semiconductor laser emitters, the peak oscillation wavelength corresponding to the peak strength of a laser emitted from such an emitter greatly fluctuates depending on the peripheral temperature T.

The second laser emitter 323F is configured to emit a second infrared laser outside the vehicle 1. As shown in FIG. 12, the peak oscillation wavelength $\lambda_2$ of the second infrared laser emitted from the second laser emitter 323F fluctuates depending on the peripheral temperature T. That is, the peak oscillation wavelength $\lambda_2$ is dependent on temperature. Similarly to the first infrared laser, as the peripheral temperature T rises, the peak oscillation wavelength $\lambda_2$ of the second infrared laser rises. The dependence of the peak oscillation wavelength $\lambda_2$ on the peripheral temperature T may be expressed as, for example, the following Equation (2):

$$\lambda_2(T)=aT+\lambda_{02}, \tag{2}$$

where a and $\lambda_{02}$ are constants.

The second laser emitter 323F may be, for example, a semiconductor laser emitter configured to emit an infrared laser. Specifically, the second laser emitter 323F may be a multi-longitudinal mode semiconductor laser emitter (for example, an edge-emitting Fabry-Pérot semiconductor laser emitter).

In the light source system 122F according to the present embodiment, the peak oscillation wavelength $\lambda_1$, which corresponds to the peak strength of the first infrared laser is longer than the peak oscillation wavelength $\lambda_2$, which corresponds to the peak strength of the second infrared laser (that is, $\lambda_{01}>\lambda_{02}$ is satisfied).

The thermometer 324F is configured to measure the peripheral temperature T of at least the first laser emitter 321F or the second laser emitter 323F. The thermometer 324F is, for example, a thermistor. The thermometer 324F may be installed, for example, in the vicinity of the first laser emitter 321F and/or the second laser emitter 323F or may be installed in the sensing system 6F shown in FIG. 10.

The light source controller 320F is configured to control the first laser emitter 321F and the second laser emitter 323F. Specifically, the light source controller 320F is configured to receive a signal indicating the peripheral temperature T from the thermometer 324F to control the first laser emitter 321F and the second laser emitter 323F, based on relation of the peripheral temperature T to a threshold temperature $T_{th}$ described later. The light source controller 320F may include, for example, a microcontroller and/or analog control circuitry. The microcontroller may include a processor, such as a CPU, and a memory including a ROM and a RAM. The analog control circuitry may include passive elements and active elements including a switching element, such as a MOSFET.

Figure 10:
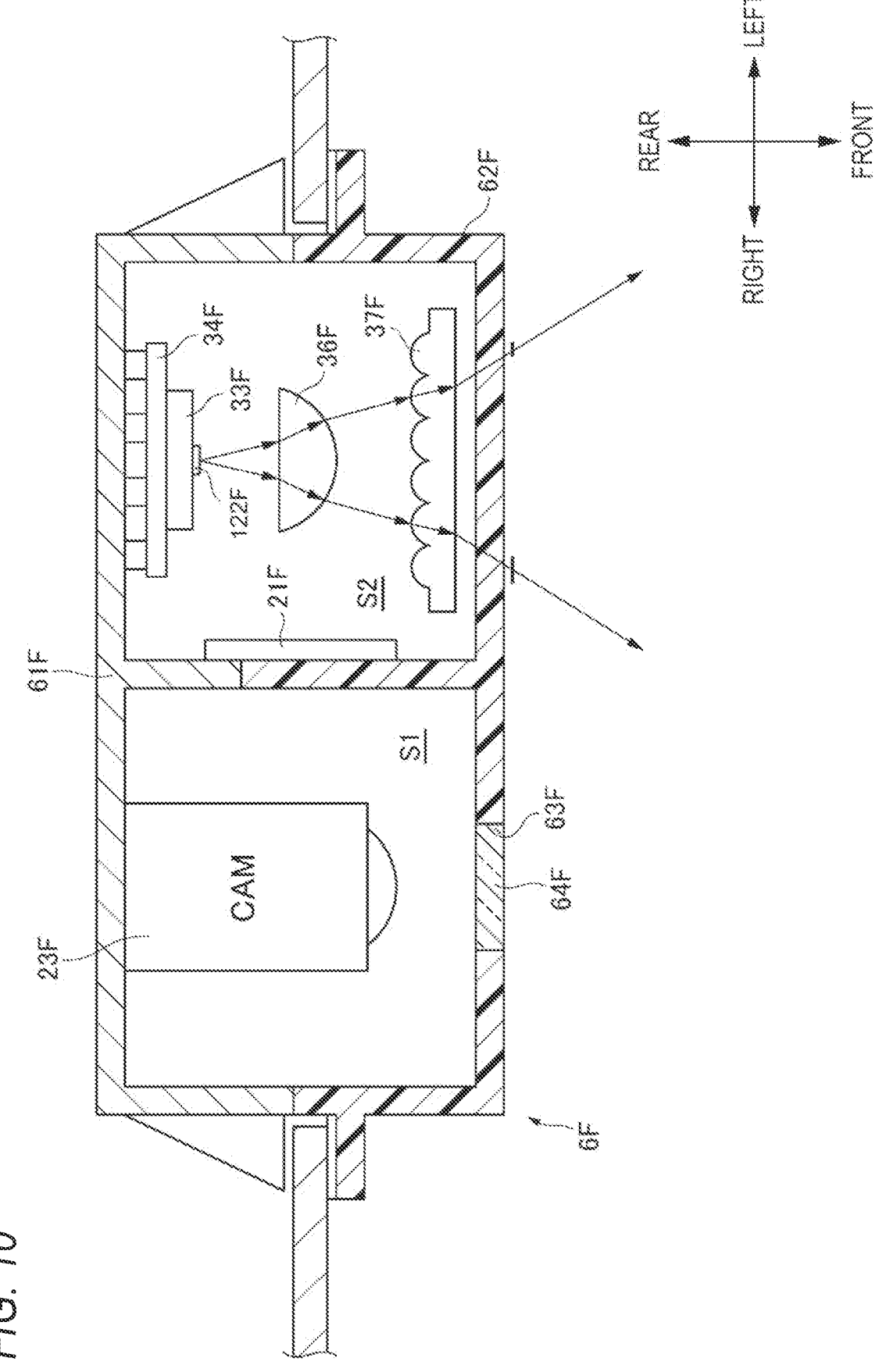
FIG. 10 is a schematic horizontal cross-sectional view of a front vehicular sensing system installed in the front of a vehicle.

Next, an example of a specific structure of the sensing system 6F will be described below with reference to FIG. 10. FIG. 10 is a schematic horizontal cross-sectional view of the sensing system 6F installed in the front of the vehicle 1. The sensing system 6R may be configured similarly to the sensing system 6F shown in FIG. 10.

As shown in FIG. 10, in the sensing system 6F, the infrared camera 23F, the light source system 122F, and the controller 21F are placed in the space formed by the housing 61F and the cover 62F. Specifically, the space formed by the housing 61F and the cover 62F includes the first space S1 and the second space S2, which is separated from the first space S1. The infrared camera 23F is placed in the first space S1, whereas the light source system 122F and the controller 21F are placed in the second space S2. According to the above configuration, since the first space S1 and the second space S2 are separated from each other, the infrared laser that has been emitted from the light source system 122F is seldom directly received by the infrared camera 23F, thereby enhancing reliability of the infrared image data acquired by the infrared camera 23F.

In the light source system 122F, the light source controller 320F, the first laser emitter 321F, the second laser emitter 323F, and the thermometer 324F may be mounted on a circuit board (not shown). The light source system 122F is mounted on the mount 33F, and the mount 33F is mounted on the heat sink 34F. Heat from the light source system 122F is diffused into air in the second space S2 via the mount 33F and the heat sink 34F. The infrared laser that has been emitted from the light source system 122F enters the projection lens 36F and is then refracted by the projection lens 36F. Thereafter, the infrared laser that has penetrated the projection lens 36F is diffused by the diffusion lens 37F and is then emitted outside. In this manner, the projection lens 36F and the diffusion lens 37F can widen coverage of the infrared laser, which has great directivity.

Formed in the cover 62F is the through hole 63F, which faces the infrared camera 23F. The through hole 63F is filled with the filter 64F, which is pervious only to infrared rays. The filter 64F is placed before the infrared camera 23F such that the infrared camera 23F receives only infrared rays. Specifically, the filter 64F is pervious only to the first infrared laser emitted from the first laser emitter 321F and the second infrared laser emitted from the second laser emitter 323F. Since the filter 64F, which is a band-pass filter pervious only to infrared rays, is placed before the infrared camera 23F in this manner, deterioration of the S/N of the signal indicating image data output from the infrared camera 23F can be preferably prevented, thereby enhancing reliability of the infrared image data. In this regard, it is preferable to narrow the bandwidth of the filter 64F for enhancing the S/N.

According to on-off control of the laser emitters described below, it becomes possible to reduce a fluctuation in the peak oscillation wavelength of an infrared laser emitted from the light source system 122F in order to narrow the bandwidth of the filter 64F, which faces the infrared camera 23F. Accordingly, since the bandwidth of the filter 64F depends on the fluctuation in the peak oscillation wavelength, it becomes possible to prevent deterioration of the S/N of the signal output from the infrared camera 23F preferably.

On-Off Control of Laser Emitters According to Second Embodiment

Figure 11:
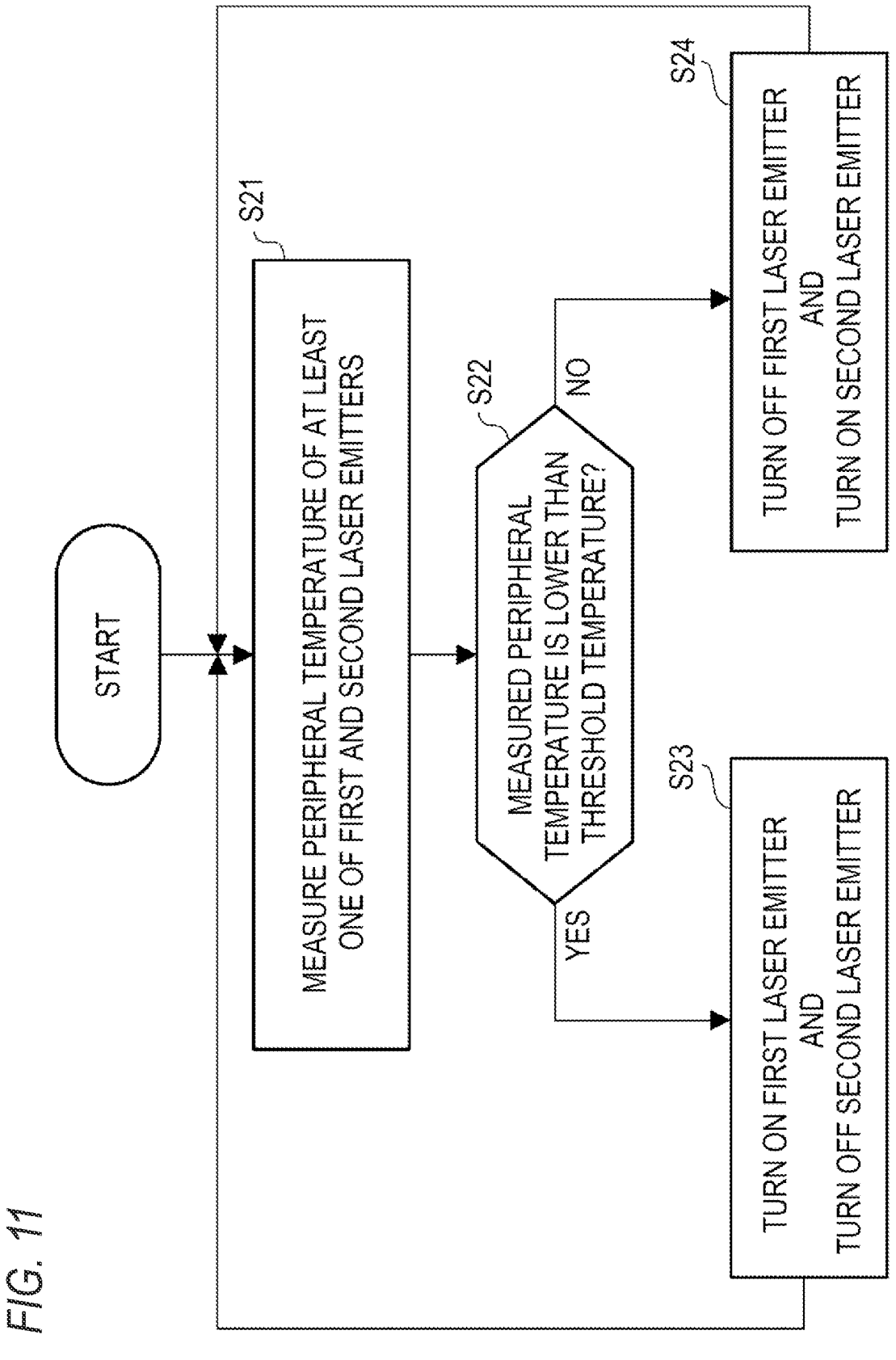
FIG. 11 is a flowchart of on-off control of a first laser emitter and a second laser emitter according to the second embodiment.

Next, on-off control of the first laser emitter 321F and the second laser emitter 323F according to the second embodiment will be described below with reference to FIGS. 11 and 12. FIG. 11 is a flowchart of the on-off control of the first laser emitter 321F and the second laser emitter 323F. FIG. 12 is a graph showing dependence of the peak oscillation wavelength $\lambda_1$ of the first infrared laser emitted from the first laser emitter 321F on temperature and dependence of the peak oscillation wavelength $\lambda_2$ of the second infrared laser emitted from the second laser emitter 323F on temperature.

The light source system 122F according to the present embodiment includes the first laser emitter 321F and the second laser emitter 323F. The peak oscillation wavelengths $\lambda_1$ and $\lambda_2$ fluctuate depending on the peripheral temperature T. The first laser emitter 321F and the second laser emitter 323F are turned on or off based on the peripheral temperature T. As shown in FIG. 12, the peak oscillation wavelength $\lambda_1$ is longer than the peak oscillation wavelength $\lambda_2$. It is assumed that fluctuation in the peak oscillation wavelengths $\lambda_1$ and $\lambda_2$ satisfies the above Equations (1) and (2). In the present embodiment, the peripheral temperature T ranges from a first temperature $T_1$, which is a minimum temperature, to a second temperature $T_2$, which is a maximum temperature. The first temperature $T_1$ is, for example, $-40°$ C., and the second temperature T2 is, for example, $125°$ C.

As shown in FIG. 11, in step S21, the thermometer 324F measures the peripheral temperature T of at least the first laser emitter 321F or the second laser emitter 323F and then transmits a signal indicating the peripheral temperature T to the light source controller 320F. Next, in step S22, the light source controller 320F receives the signal indicating the peripheral temperature T from the thermometer 324F and then determines whether the peripheral temperature T is lower than the threshold temperature $T_{th}$ or not.

As shown in FIG. 12, it is preferable that the threshold temperature $T_{th}$ be in the range of $T_a$-$T_b$. The peak oscillation wavelength $\lambda_2(T_a)$ is equal to the peak oscillation wavelength $\lambda_1(T_1)$, and the peak oscillation wavelength $\lambda_1(T_b)$ is equal to the peak oscillation wavelength $\lambda_2(T_2)$. Accordingly, the peak oscillation wavelength $\lambda_2(T_{th})$ is longer than or equal to the peak oscillation wavelength $\lambda_1(T_1)$, and the peak oscillation wavelength $\lambda_1(T_1)$ is shorter than or equal to the peak oscillation wavelength $\lambda_2(T_2)$.

Next, if the light source controller 320F determines that the peripheral temperature T is lower than the threshold temperature $T_{th}$ (YES at step S22), the light source controller 320F turns on the first laser emitter 321F and turns off the second laser emitter 323F (step S23). On the other hand, if the light source controller 320F determines that the peripheral temperature T is higher than or equal to the threshold temperature $T_{th}$ (NO at step S22), the light source controller 320F turns off the first laser emitter 321F and turns on the second laser emitter 323F (step S24). These steps may be repeated as appropriate.

In the present embodiment, as shown in FIG. 12, the first infrared laser is emitted from the light source system 122F if the peripheral temperature T is lower than the threshold temperature $T_{th}$, whereas the second infrared laser is emitted from the light source system 122F if the peripheral temperature T is higher than or equal to the threshold temperature $T_{th}$. Therefore, a fluctuation $\Delta\lambda_e$ in the peak oscillation wavelength of the infrared laser emitted from the source system 122F when the peripheral temperature T varies from the first temperature $T_1$ to the second temperature $T_2$ satisfies the following Equation (3):

$$\Delta\lambda_e = \lambda_2(T_2) - \lambda(T_1) = a(T_2 - T_1) - (\lambda_{01} - \lambda_{02}). \quad (3)$$

Meanwhile, a fluctuation $\Delta\lambda_c$ in the peak oscillation wavelength of the first or the second infrared laser when the peripheral temperature T varies from the first temperature $T_1$ to the second temperature $T_2$ satisfies the following Equation (4):

$$\Delta\lambda_c = a(T_2 - T_1). \quad (4)$$

Accordingly, the fluctuation $\Delta\lambda_e$ is smaller than the fluctuation $\Delta\lambda_c$ by $\lambda_{01}$-$\lambda_{02}$. That is, by the on-off control of the first laser emitter 321F and the second laser emitter, it becomes possible to reduce the fluctuation in the peak oscillation wavelength by $\lambda_{01}$-$\lambda_{02}$.

According to the present embodiment, if the peripheral temperature T is lower than the threshold temperature $T_{th}$, the first laser emitter 321F is turned on, whereas the second laser emitter 323F is turned off. On the other hand, if the peripheral temperature T is higher than or equal to the threshold temperature $T_{th}$, the first laser emitter 321F is turned off, whereas the second laser emitter 323F is turned on. Accordingly, it becomes possible to reduce dependence of the peak oscillation wavelength of the infrared laser emitted from the light source system 122F even if the peak oscillation wavelengths $\lambda_1$ and $\lambda_2$ greatly fluctuate due to fluctuation in the peripheral temperature T. In other words, the fluctuation of the peak oscillation wavelength of the infrared laser emitted from the light source system 122F can be reduced.

Therefore, it becomes possible to narrow the bandwidth of the filter 64F (an example of a band-pass filter), which is placed before the infrared camera 23F. Accordingly, the S/N of the signal output from the infrared camera 23F can be enhanced, and thus deterioration of detection accuracy of the infrared camera 23F can be preferably prevented.

In addition, according to the present embodiment, the peak oscillation wavelength $\lambda_2(T_{th})$ is longer than or equal to the peak oscillation wavelength $\lambda_1(T_1)$, and the peak oscillation wavelength $\lambda_1(T_{th})$ is shorter than or equal to the peak oscillation wavelength $\lambda_2(T_2)$. Accordingly, the fluctuation in the infrared laser emitted from the light source system 122F can be reduced.

On-Off Control of Laser Emitters According to Modification of Second Embodiment

Figure 14:
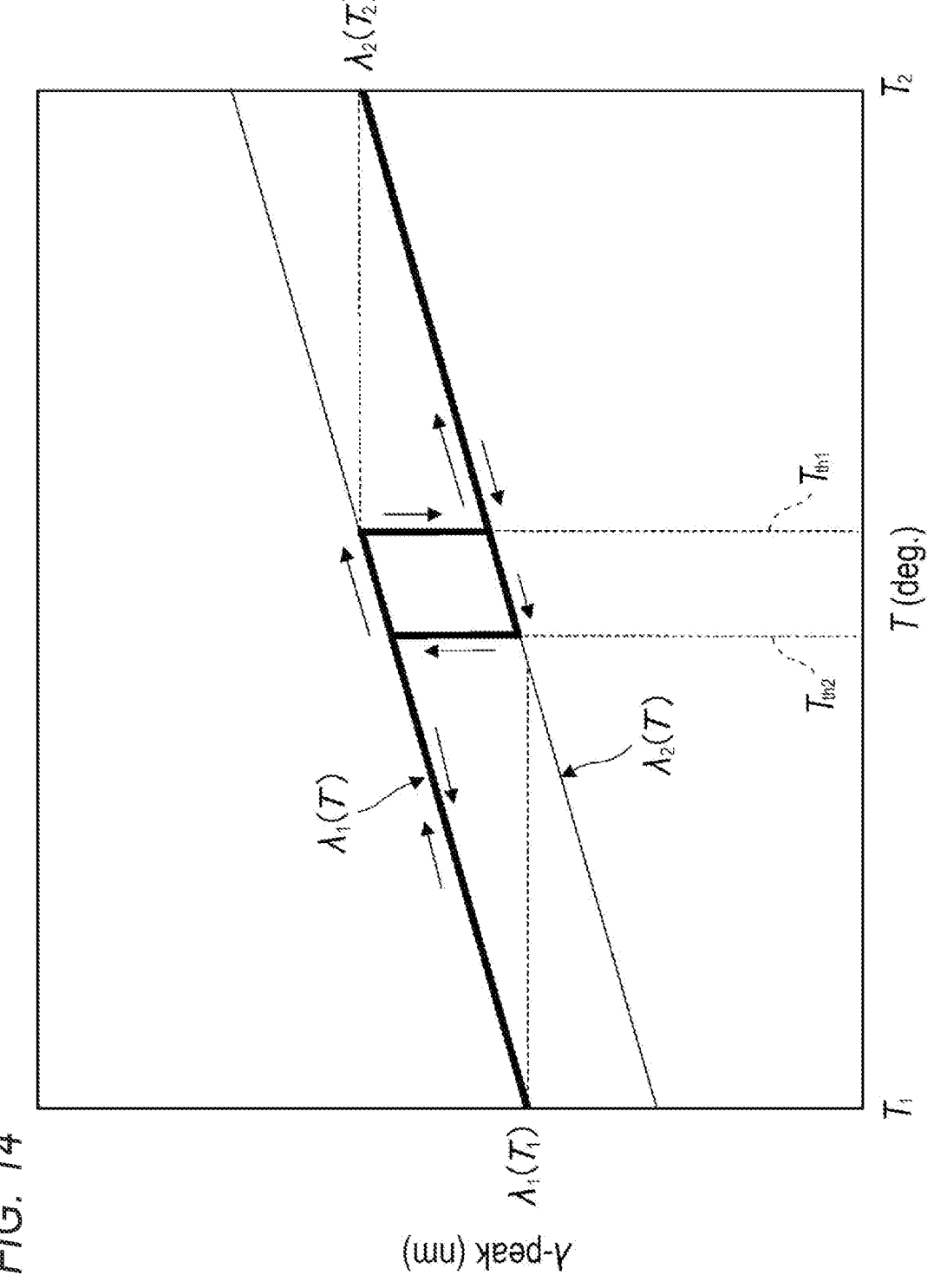
FIG. 14 is a graph showing dependence of the peak oscillation wavelengths of the two infrared lasers on temperature, which is presented for explaining the on-off control of the first and the second laser emitters based on two threshold temperatures.

Next, on-off control of the first laser emitter 321F and the second laser emitter 323F according to a modification of the second embodiment will be described below with reference to FIGS. 13 and 14. FIG. 13 is a flowchart of the on-off control of the first laser emitter 321F and the second laser emitter 323F according to the modification. FIG. 14 is a graph showing dependence of the peak oscillation wavelengths of the two infrared lasers on temperature, which is presented for explaining the on-off control of the first laser emitter 321F and the second laser emitter 323F based on two threshold temperatures $T_{th1}$ and $T_{th2}$.

The present modification is different from the first embodiment in that the first laser emitter 321F and the second laser emitter 323F are turned on or off based on relation of the two threshold temperatures $T_{th1}$ and $T_{th2}$ to the peripheral temperature T (see FIG. 14). As shown in FIG. 14, it is assumed that the first threshold temperature $T_{th1}$ is higher than the second threshold temperature $T_{th2}$.

As shown in FIG. 13, in step S30, the thermometer 324F measures the peripheral temperature T of at least the first laser emitter 321F or the second laser emitter 323F. Thereafter, the thermometer 324F transmits a signal indicating the peripheral temperature T to the light source controller 320F. Next, in step S31, the light source controller 320F receives the signal indicating the peripheral temperature T from the thermometer 324F, and then determines whether the peripheral temperature T is rising or falling.

Thereafter, if the light source controller 320F determines that the peripheral temperature T is increasing, the light source controller 320F determines whether the peripheral temperature T is lower than the first threshold temperature $T_{th1}$ or not (step S32). If the light source controller 320F determines that the peripheral temperature T is lower than the first threshold temperature $T_{th1}$ (YES at step S32), the light source controller 320F turns on the first laser emitter 321F and turns off the second laser emitter 323F (step S33). On the other hand, if the light source controller 320F determines that the peripheral temperature T is higher than or equal to the first threshold temperature $T_{th1}$ (NO in step S32), the light source controller 320F turns off the first laser emitter 321F and turns on the second laser emitter 323F (step S34).

If the light source controller 320F determines that the peripheral temperature T is decreasing, the light source controller 320F determines whether the peripheral temperature T is lower than the second threshold temperature $T_{th2}$, which is lower than the first threshold temperature $T_{th1}$, or not (step S35). If the light source controller 320F determines that the peripheral temperature T is lower than the second threshold temperature $T_{th2}$ (YES at step S35), the light source controller 320F turns on the first laser emitter 321F and turns off the second laser emitter 323F (step S33). On the other hand, if the light source controller 320F determines that the peripheral temperature T is higher than or equal to the second threshold temperature $T_{th2}$ (NO at step S35), the light source controller 320F turns off the first laser emitter 321F and turns on the second laser emitter 323F (step S34). These steps may be repeated as appropriate.

According to the present modification, by the on-off control of the first laser emitter 321F and the second laser emitter 323F based on the relation of the two threshold temperatures $T_{th1}$ and $T_{th2}$ to the peripheral temperature T, hysteresis is imparted to the switching based on threshold. Accordingly, even if the peripheral temperature T oscillates quickly around the first threshold temperature $T_{th1}$ or the second threshold temperature $T_{th2}$, the first laser emitter 321F and the second laser emitter 323F are preferably prevented from being turned on or off frequently. In addition, similarly to the second embodiment, it becomes possible to reduce dependence of the peak oscillation wavelength of the infrared laser emitted from the light source system 122F even if the peak oscillation wavelengths $\lambda_1$ and $\lambda_2$ greatly fluctuate due to fluctuation in the peripheral temperature T. In other words, the fluctuation of the peak oscillation wavelength of the infrared laser emitted from light source system 122F can be reduced.

Although some embodiments of the present disclosure have been described above, it goes without saying that the technical scope of the present invention should not be interpreted as being limited by the descriptions of the embodiments. It should be understood by a person skilled in the art that embodiments are merely examples and the embodiments can be modified within the scope of the invention described in the claims. The technical scope of the present invention should be determined based on the scope of the claims and equivalences thereof.

Although an infrared camera has been described as an example of the infrared sensor, the first and the second embodiments are not limited thereto. For example, a sensor of a LiDAR unit that is mounted on a vehicle and is configured to generate data of a point cloud indicating surroundings of the vehicle may be the infrared sensor. In this case, an infrared light source of the LiDAR unit may be the vehicular light source system. Specifically, the infrared light source of the LiDAR unit may include the first laser emitter and the second laser emitter that has dependence, different from that of the first laser emitter, of the strength of an emitted infrared laser on temperature. Further, a thermometer configured to measure the peripheral temperature T of the laser emitters and a light source controller configured to turn on or off the first and the second laser emitters may be included in the infrared light source of the LiDAR unit.

In addition, although vehicular light source systems configured to emit an infrared laser have been described, the first and the second embodiments are not limited thereto. For example, the vehicle light source system may be configured to emit a visible laser. In this case, in the first embodiment, dependence of the strength of the visible laser emitted from the first laser emitter on temperature and that of the strength of the visible laser emitted from the second laser emitter on temperature are different from each other. In the second embodiment, the peak oscillation wavelength of the visible laser emitted from the first laser emitter and that of the visible laser emitted from the second laser emitter fluctuate depending on peripheral temperature. The vehicular light source system configured to emit the visible laser may be, for example, a light source of a road surface projector configured to project a light pattern on a road surface or a light source of a lamp configured to achieve high beam or low beam distribution ahead a vehicle.

The present application is based on Japanese Patent Application Nos. 2020-088259 and 2020-088260, filed on May 20, 2020, the entire contents of which are incorporated herein by reference.

The invention claimed is:

1. A vehicular light source system mountable on a vehicle, the vehicular light source system comprising:
   a first laser emitter configured to emit a first laser outside the vehicle;
   a second laser emitter configured to emit a second laser outside the vehicle;
   a thermometer configured to measure peripheral temperature of at least one of the first and the second laser emitters; and
   a light source controller configured to control the first and the second laser emitters, based on relation of the peripheral temperature to a threshold temperature, wherein
   strength of the first laser at a temperature lower than the threshold temperature is higher than strength of the second laser at the temperature lower than the threshold temperature,
   the strength of the first laser at a temperature higher than the threshold temperature is lower than that of the second laser at the temperature higher than the threshold temperature, and
   the light source controller is configured to control the first and the second laser emitters such that:
       the strength of the first laser becomes higher than that of the second laser if the peripheral temperature is lower than the threshold temperature; and
       the strength of the second laser becomes higher than that of the first laser if the peripheral temperature is higher than or equal to the threshold temperature.

2. The vehicular light source system according to claim 1, wherein
   the light source controller is configured to:
       turn on the first laser emitter and turn off the second laser emitter if the peripheral temperature is lower than the threshold temperature; and
       turn off the first laser emitter and turn on the second laser emitter if the peripheral temperature is higher than or equal to the threshold temperature.

3. The vehicular light source system according to claim 1, wherein
   the threshold temperature is a temperature at which a curve of the strength of the first laser and a curve of the strength of the second laser intersect.

4. The vehicular light source system according to claim 1, wherein the first and the second laser emitters each include a plurality of surface-emitting laser elements arranged in a two-dimensional array.

5. The vehicular light source system according to claim 1, wherein the threshold temperature includes:

a first threshold temperature; and a second threshold temperature, which is lower than the first threshold temperature, and the light source controller is configured to:

turn on the first laser emitter and turn off the second laser emitter if the peripheral temperature is rising and is lower than the first threshold temperature;

turn off the first laser emitter and turn on the second laser emitter if the peripheral temperature is rising and is higher than or equal to the first threshold temperature;

turn on the second laser emitter and turn off the first laser emitter if the peripheral temperature is falling and is higher than or equal to the second threshold temperature; and turn off the second laser emitter and turn off the first laser emitter if the peripheral temperature is falling and is lower than the second threshold temperature.

6. The vehicular light source system according to claim 1, wherein the first and the second lasers are infrared lasers.

7. A vehicular sensing system, comprising:

the vehicular light source system according to claim 6; and an infrared sensor that is mountable on the vehicle and is configured to acquire information related to surroundings of the vehicle.

8. A vehicle, comprising:

the vehicular sensing system according to claim 7.

9. A vehicular light source system mountable on a vehicle, the vehicular light source system comprising:

a first laser emitter configured to emit a first laser outside the vehicle;

a second laser emitter configured to emit a second laser outside the vehicle;

a thermometer configured to measure peripheral temperature of at least one of the first and the second laser emitters; and a light source controller configured to turn on one of the first and the second laser emitters and turn off the other one of the first and the second laser emitters, based on relation of the peripheral temperature to a threshold temperature, wherein a peak oscillation wavelength of the first laser is longer than a peak oscillation wavelength of the second laser, the peak oscillation wavelengths of the first and the second lasers fluctuate depending on the peripheral temperature, and the light source controller is configured to:

turn on the first laser emitter and turn off the second laser emitter if the peripheral temperature is lower than the threshold temperature; and turn off the first laser emitter and turn on the second laser emitter if the peripheral temperature is higher than or equal to the threshold temperature, wherein the peripheral temperature ranges from a first temperature to a second temperature, which is higher than the first temperature, the peak oscillation wavelength of the second laser at the threshold temperature is longer than or equal to that of the first laser at the first temperature, and the peak oscillation wavelength of the first laser at the threshold temperature is shorter than or equal to that of the second laser at the second temperature.

10. The vehicular light source system according to claim 9, wherein the first and the second laser emitters are each a multi-longitudinal mode laser emitter.

11. The vehicular light source system according to claim 9, wherein the first and the second lasers are infrared lasers.

12. A vehicular sensing system, comprising:

the vehicular light source system according to claim 11;

an infrared sensor that is mountable on the vehicle and is configured to acquire information related to surroundings of the vehicle; and a band-pass filter that is placed before the infrared sensor and is pervious to infrared rays.

13. A vehicle, comprising:

the vehicular sensing system according to claim 12.

14. A vehicular light source system mountable on a vehicle, the vehicular light source system comprising:

a first laser emitter configured to emit a first laser outside the vehicle;

a second laser emitter configured to emit a second laser outside the vehicle;

a thermometer configured to measure peripheral temperature of at least one of the first and the second laser emitters; and a light source controller configured to turn on one of the first and the second laser emitters and turn off the other one of the first and the second laser emitters, based on relation of the peripheral temperature to a threshold temperature, wherein a peak oscillation wavelength of the first laser is longer than a peak oscillation wavelength of the second laser, the peak oscillation wavelengths of the first and the second lasers fluctuate depending on the peripheral temperature, and the light source controller is configured to:

turn on the first laser emitter and turn off the second laser emitter if the peripheral temperature is lower than the threshold temperature; and turn off the first laser emitter and turn on the second laser emitter if the peripheral temperature is higher than or equal to the threshold temperature, wherein the threshold temperature includes:

a first threshold temperature; and a second threshold temperature, which is lower than the first threshold temperature, and the light source controller is configured to:

turn on the first laser emitter and turn off the second laser emitter if the peripheral temperature is rising and is lower than the first threshold temperature;

turn off the first laser emitter and turn on the second laser emitter if the peripheral temperature is rising and is higher than or equal to the first threshold temperature;

turn off the first laser emitter and turn on the second laser emitter if the peripheral temperature is falling and is higher than or equal to the second threshold temperature; and turn on the first laser emitter and turn off the second laser emitter if the peripheral temperature is falling and is lower than the second threshold temperature.

15. The vehicular light source system according to claim 14, wherein the first and the second lasers are infrared lasers.

16. A vehicular sensing system, comprising:

the vehicular light source system according to claim 15;

an infrared sensor that is mountable on the vehicle and is configured to acquire information related to surroundings of the vehicle; and a band-pass filter that is placed before the infrared sensor and is pervious to infrared rays.

17. A vehicle, comprising:

the vehicular sensing system according to claim 16.

\* \* \* \* \*